(12) United States Patent
Goto et al.

(10) Patent No.: US 6,456,681 B1
(45) Date of Patent: *Sep. 24, 2002

(54) NEUTRON FLUX MEASURING APPARATUS

(75) Inventors: Yasushi Goto; Nobuaki Oono; Yuki Narawa; Teruji Tarumi, all of Yokohama; Koji Hirukawa, Kanagawa-Ken, all of (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/386,142

(22) Filed: Aug. 31, 1999

(30) Foreign Application Priority Data

Aug. 31, 1998 (JP) .......................... 10-245972
Aug. 5, 1999 (JP) .......................... 11-223001

(51) Int. Cl.[7] .......................................... C21C 17/108
(52) U.S. Cl. .................. 376/254; 376/259; 250/382; 250/385.1; 250/390.01; 250/391; 250/392
(58) Field of Search ................... 376/254, 259; 250/385.1, 390.01, 391, 382, 392

(56) References Cited

U.S. PATENT DOCUMENTS

| | | | | |
|---|---|---|---|---|
| 3,043,954 A | * | 7/1962 | Boyd et al. ............... 250/83.1 |
| 3,565,760 A | * | 2/1971 | Parkos et al. ............... 176/24 |
| 3,579,127 A | * | 5/1971 | Thomas ..................... 328/145 |
| 3,898,466 A | * | 8/1975 | Kawashima | |
| 4,103,166 A | * | 7/1978 | Niessel et al. ............... 250/391 |
| 4,121,106 A | * | 10/1978 | Terhune et al. ............. 250/390 |
| 4,493,811 A | * | 1/1985 | Seki et al. | |
| 4,568,514 A | * | 2/1986 | Lingren et al. ............. 375/255 |
| 4,623,508 A | * | 11/1986 | Glesius et al. | |
| 4,634,568 A | * | 1/1987 | Wimpee et al. ............. 376/154 |
| 4,652,419 A | * | 3/1987 | Fukiushima et al. | |
| 4,963,315 A | * | 10/1990 | Bednar et al. | |
| 5,249,207 A | * | 9/1993 | Bacconet | |
| 5,406,598 A | * | 4/1995 | Takeuchi et al. ............ 276/254 |
| 5,555,279 A | * | 9/1996 | Nir et al. ..................... 376/216 |
| 5,930,317 A | * | 7/1999 | Kono .......................... 376/259 |
| 5,956,380 A | * | 9/1999 | Kiel et al. | |
| 6,181,761 B1 | * | 1/2001 | Izumi et al. | |

FOREIGN PATENT DOCUMENTS

JP          09-243754 A          9/1997

* cited by examiner

*Primary Examiner*—Michael J. Carone
*Assistant Examiner*—John Richardson
(74) *Attorney, Agent, or Firm*—Finnegan, Henderson, Farabow, Garrett & Dunner, L.L.P.

(57) ABSTRACT

A neutron flux measuring apparatus, adapted to a boiling-water reactor (BWR) of a nuclear power plant and an advanced boiling-water reactor (ABWR) of a nuclear power plant, for measuring a neutron flux in a reactor pressure vessel, comprises a neutron flux detector assembly incorporating a local power range monitor detector assembly and a start-up range neutron monitor detector, a preamplifier amplifying a detector signal obtained from said start-up range neutron monitor detector, a start-up range neutron monitor operation unit operating, indicating and monitoring the amplified signal of the start-up range neutron monitor detector, and a local power range monitor operation unit operating, indicating and monitoring a signal obtained from the local power range monitor detector.

20 Claims, 13 Drawing Sheets

BYPASS GROUP ①

BYPASS GROUP ②

BYPASS GROUP ③

NEUTRON FLUX MEASURING APPARATUS

BACKGROUND OF THE INVENTION

The present invention relates to a neutron flux measuring apparatus or instrument in a reactor pressure vessel in a boiling-water reactor (BWR, ABWR) of a nuclear power plant.

A neutron flux measuring apparatus is used to measure neutron flux, display the power of the reactor because the reactor power is in proportion to the neutron flux and to evaluate the burning degree of a fuel, and also used as a detecting element for protecting the nuclear reactor at a time of excess power output because of quick response to variation of the power.

This neutron flux measuring apparatus consists of a neutron flux detector and a measuring device amplifying and displaying the signal from the detector. Since the measuring range is quite wide, it is necessary to accurately measure the power output from rated power to about $10^{-10}$ times as high as the rated power and it is, therefore, difficult to measure entire range using one type of a measuring apparatus. For that reason, start-up range neutron monitor (to be referred to as 'SRNM' hereinafter) detectors for measuring low power ranges and local power range monitor (to be referred to as 'LPRM' hereinafter) detectors for measuring high power ranges are used. A set of four LPRM detectors are vertically arranged in the reactor pressure vessel in axial direction and form a local power range monitor detector assembly as a whole.

Conventionally, eight or ten SRNM detectors are normally installed, whereas 52 LPRM detector assemblies (or 208 detectors) are installed in an ABWR. The SRNM detectors and LPRM detector assemblies are arranged separately in the reactor pressure vessel.

Now, description will be given to a case where ten SRNM detectors and 52 LPRM detector assemblies (208 detectors) are installed.

FIG. 12 shows the arrangement of SRNM detectors and LPRM detector assemblies at a reactor core in a conventional advanced boiling-water reactor (to be referred to as 'ABWR' hereinafter).

As shown in FIG. 12, ten SRNM detectors (A, B, C, D, E, F, G, H, J, L) are equally arranged at a reactor core 1. Since one operation (arithmetic) unit is arranged for each SRNM detector, an SRNM consists of ten SRNM detectors and ten operation units.

The detectors are used as detecting elements for the protection of the reactor when the power output thereof is in excess and the detectors detect an abnormal transient change which takes place during operation, emit a reactor emergency shutdown (reactor scram) signal and shut down the reactor. To detect such an abnormal transient change, the detectors is divided into reactor protection system divisions (sections), respectively. The reactor protection system divisions are composed of double special logic structural circuits such as "1 out of 2" and "2 out of 4" and prevents unnecessary reactor shutdown due to erroneous operation and abnormal operation due to inactive operation.

The SRNM operation unit calculates a neutron flux level in the detector, calculates the increase degree of a neutron flux in the form of period (reactor period) and emits a control rod pull-out prohibiting signal or a scram signal when the calculated period is below a predetermined period, thus functioning as a safety protection system.

FIG. 13 shows that the SRNM detectors are divided into the reactor protection system divisions.

As shown in FIG. 13, the SRNM detectors (A, E, J) are in a division (section) I and the SRNM detectors (B, F) are in a division II. The SRNM detectors (C, G, L) are in a division III and the SRNM detectors (D, H) are in a division IV. The SRNM detectors are divided into the divisions I to IV each including tow or three ones.

Meanwhile, the LPRM consists of 52 detector assemblies (208 detectors) and 16 operation units, and the 52 detectors and the four operation units are partitioned into each of the four sections, as shown in FIG. 12.

The LPRM operation units or average power range monitor (to be referred to as 'APRM' hereinafter) operation units are allotted with signals of the respective LPRM detectors in accordance with the reactor protection system divisions, standardize and calibrates the signals to local power level using signals from a TIP traversing incore probe (to be referred to as 'TIP' hereinafter) detector or a gamma thermometer. The signals are further fed to the APRON operation units in which signals from LPRM detectors belonging to the respective APRM channels are averaged thereby to create APRM signals. Each of the APRM operation units generates a trip signal such as a control rod pull-out prohibition and scram if the APRM signal exceeds a predetermined APRM signal level and activates scram by means of the double special logic structural circuits such as "1 out of 2" and "2 out of 4" described above.

In the meantime, it is required for the detectors such as the SRNM detectors as well as their respective operation units to be regularly inspected and maintained. While maintaining and adjusting these detectors and operation units, if it is detected that the data during adjustment is abnormal, a reactor scram signal is outputted and the reactor is shut down. For this reason, at the time of the maintenance and adjustment of the detectors or operation units themselves, the detectors or units are precluded from normal monitoring, which is referred to as bypassing. To execute bypassing, the detectors are divided into groups other than the reactor protection system divisions in the SRNM monitor.

This is because the range the SRNM detectors can monitor corresponds to the radius of the reactor core. The detector arrangement in the reactor as well as the bypass groups are set such that even if part of SRNM detectors or operation units are bypassed, two or more detectors in different reactor protection system divisions are present within a distance corresponding to the radius of the reactor from the arbitrary position of a control rod in consideration of monitoring an arbitrary range in the reactor without adversely influencing the reactor emergency shutdown function. With the ten detecors being provided, it is impossible to make the bypass groups coincident with the reactor protection system divisions.

Now, it is assumed that the bypass groups are made coincident with the reactor protection system divisions in the conventional start-up range monitor arrangement. In FIG. 13, if the SRNM detectors (A, F, L, D) are bypassed, there is no detector which can monitor the upper right range on the reactor core plane shown in FIG. 12 and the above conditions cannot be satisfied.

It is, therefore, necessary to set bypass groups different from the reactor protection system divisions.

FIG. 14 shows the bypass groups for the SRNM detectors.

As shown in FIG. 14A, the SRNM detectors (A, B, F, G) are sectioned in a bypass group ① and the SRNM detectors (C, E, H) are sectioned in a bypass group ②. The remaining SRNM detectors (D, J, L) are sectioned in a bypass group ③.

Further, as shown in FIG. 14B, since only one detector in the respective bypass groups from ① to ③ is bypassed, the allowable number of bypassed detectors is up to three.

It is noted that since an operation unit is provided per detector in the SRNM monitor, detector bypassing and operation unit bypassing are carried out by the same operation.

Meanwhile, many LPRM detectors ace arranged and necessary number of detectors for monitoring average power output are arranged in the reactor for each reactor protection system division. For this reason, it is possible to make the bypass groups coincident with the reactor protection system divisions and to bypass a plurality of detectors to the extent that the number of detectors is not below the number required for APRM operation. Furthermore, even if all of the detectors belonging to an optional division (section) are bypassed, no problem occurs to the reactor emergency shutdown function as long as the remaining sections are in a state in which the average power output of the reactor core can be monitored. Thus, the operation unit can be commonly used for a plurality of detectors, and the bypassing of operation units is made allowable.

Recently, a reactor pressure vessel is becoming larger in size so to increase reactor power, and accordingly, it has been required to increase the number of SRNM detectors which number has been conventionally eight to ten.

If the number of the SRNM detectors increases, however, many guide tubes and flanges must be provided in the reactor when the SRNM detectors are installed, which involves cost increasing. In addition, as the number of detectors increases, design, operation and the like become increasingly complicated, such as the interference of the position, at which instrumentation is arranged, with the support structure below the reactor core, thus providing a problem.

Furthermore, it is not allowed to bypass SRNM detectors in an optional one division among the reactor protection system divisions altogether (which bypassing will be referred to as section 'bypassing' hereinafter) at the time of starting the reactor from the viewpoint of monitoring reactor power output at an arbitrary position in the reactor core. Therefore, if a plurality of detectors shares an operation unit for each section (division), the operation unit cannot be bypassed to thereby cause a problem in the operation. For this reason, an operation unit is required per detector in the start-up range monitor, and as the number of detectors increases, the number of operation units needs to increase.

Specifically, in a present advanced boiling-water reactor (ABWR) plant, a neutron flux measuring apparatus is provided with ten SRNM detectors and 52 LPRM detectors, which detectors are provided individually in the reactor pressure vessel. For this reason, the total number of the neutron detectors is 62 and the installation of guide tubes and flanges in the reactor for the 62 detectors is required. Besides, the 26 operation units for monitoring start-up ranges and local power ranges. As the number of detectors increases, cost disadvantageously increases, which is an economic problem.

Moreover, the reactor protection system divisions sections shown in FIG. 13 and the bypass groups shown in FIG. 14 differ in the allocation of detectors. This makes the recognition and dealing of detectors laborious for operators involved with the reactor operation, thereby causing a problem in the operation.

SUMMARY OF THE INVENTION

The present invention has been made to solve the defects or problems encountered in the prior art mentioned above and the first object of the present invention is to provide a neutron flux measuring apparatus having increased cost-efficiency without deteriorating monitoring performance by jointly using detectors and operation units to thereby reduce the number of necessary detectors and operation units.

It is another object of the present invention to provide a neutron flux measuring apparatus capable of reducing labor during operation of a reactor and enhancing operability by making reactor protection system divisions and bypass groups have the same constitution in the start-up range neutron monitor.

These and other objects can be achieved according to the present invention by providing, in one aspect, a neutron flux measuring apparatus, adapted to a boiling-water reactor (BWR) of a nuclear power plant and an advanced boiling-water reactor (ABWR) of a nuclear power plant, for measuring a neutron flux in a reactor pressure vessel, said neutron flux measuring apparatus comprising:

a neutron flux detector assembly incorporating a local power range monitor detector assembly and a start-up range neutron monitor detector;

a preamplifier amplifying a detector signal obtained from said start-up range neutron monitor detector;

a start-up range neutron monitor operation unit operating, indicating and monitoring the amplified signal of the start-up range neutron monitor detector; and a local power range monitor operation unit operating, indicating and monitoring a signal obtained from said local power range monitor detector.

In preferred embodiments in this aspect, the start-up range neutron monitor operation unit and the local power range monitor operation unit are integrated into a signal unit.

The neutron flux measuring apparatus may further comprises reactor mode monitoring means for inputting and monitoring a state of a reactor mode switch and calculation frequency switching means for making high a calculation frequency of a start-up range monitor operation function and making low a calculation frequency of a power range monitor operation function within an integrated operation unit of the neutron flux measuring apparatus while a reactor mode is in a start-up state and for conversely making low a calculation frequency of the start-up range monitor operation function and making high a calculation frequency of the power range monitor operation function while the reactor mode is in an operation state.

The start-up range neutron monitor detector includes a bypass group having same detector channel arrangement as a detector channel arrangement of a reactor protection system division.

The neutron flux detector assembly includes the start-up range neutron monitor detector coated with an insulation layer having resistance to an environment within a reactor pressure vessel.

The neutron flux detector assembly includes the start-up range neutron monitor detector installed in a small-diameter hollow tube.

Each of the reactor protection separation divisions is provided with a plural signal processing start-up range neutron monitor operation unit, which operates, indicates and monitors signals of a plurality of start-up range neutron monitor detectors belonging to the same reactor protection system division. Bypass means may be further provided for bypassing a plural signal processing start-up range neutron monitor operation function belonging to one of the reactor protection system divisions.

A plurality of neutron flux detector assemblies, each incorporating a start-up range neutron monitor detector, are arranged in vicinity of a center of a reactor core, the number of the neutron flux detector assemblies being the same as the number of reactor protection system divisions, the neutron flux detector assemblies, the number of which is twice or more of the number of reactor protection system divisions, are arranged on a peripheral portion surrounding the neutron flux detector assemblies arranged in vicinity of a center of the reactor core, and there is further provided start-up range neutron monitor detector bypass groups, the number of which is the same as the number of the reactor protection system divisions, including a set of a start-up range neutron monitor detector incorporated into one neutron flux detector assembly in vicinity of a center and the start-up range neutron monitor detector incorporated into two or more neutron, flux detector assemblies on the peripheral portion, the start-up range neutron monitor detectors being allotted to the reactor protection system divisions with the same groups as the bypass groups. There may be further provided bypass means for bypassing an operating, indicating and monitoring function for an optional one of signals from the start-up range neutron monitor detectors belonging to the same reactor protection system division.

The above mentioned objects scan be achieved according to the present invention by providing, in a second aspect, a neutron flux measuring apparatus, adapted to a boiling-water reactor (BWR) of a nuclear power plant and an advanced boiling-water reactor (ABWR) of a nuclear power plant, for measuring a neutron flux in a reactor pressure vessel, the neutron flux measuring apparatus comprising:

a plurality of neutron flux detector assemblies each incorporating a start-up range monitor detector, each of the plurality of neutron flux detector assemblies comprising a local power range monitor detector, a start-up range neutron monitor detector, calibrating means for calibrating sensitivity of the local power range monitor detector and a cover tube incorporating the local power range monitor detector, the start-up range neutron monitor detector and the calibrating means;

a plurality of neutron flux detector assemblies each comprising the local power range monitor detector, the calibrating means and said cover tube;

a preamplifier amplifying a detector signal obtained from the start-up range neutron monitor detector;

a start-up range neutron monitor operation unit operating, indicating and monitoring the amplified signal obtained from the start-up range neutron monitor detector;

a local power range monitor operation unit operating, indicating and monitoring a signal obtained from the local power range monitor detector; and an average power range monitor operation unit averaging, indicating and monitoring signals obtained from a plurality of local power range monitor detectors.

In preferred embodiment of this second aspect, the start-up range neutron monitor operation unit and the local power range monitor operation unit are integrated into a signal unit. There may be further provided reactor mode monitoring means for inputting and monitoring a state of a reactor mode switch and calculation frequency switching means for making high a calculation frequency of a start-up range monitor operation function and making low a calculation frequency of a power range monitor operation function within an integrated operation unit of the neutron flux measuring apparatus while a reactor mode is in a start-up state, and for conversely making low a calculation frequency of the start-up range monitor operation function and making high a calculation frequency of the power range monitor operation function while the reactor mode is in a run mode state.

The average power range monitor operation unit, the start-up range neutron monitor operation unit and the local power range monitor operation unit are integrated into a single unit. The start-up range neutron monitor detector includes a bypass group having same detector channel arrangement as a detector channel arrangement of a reactor protection system division.

Each of the neutron flux detector assemblies includes a start-up range neutron monitor detector coated with an insulation layer having resistance to an environment within a reactor pressure vessel.

The neutron flux detector assembly includes a start-up range neutron monitor detector installed in a small-diameter hollow tube.

Each of the reactor protection system divisions is provided with a plural signal processing start-up range neutron monitor operation unit, which operates, indicates and monitors signals of a plurality of start-up range neutron monitor detectors belonging to the same reactor protection system division. The plural signal processing start-up range neutron monitor operation unit, at least one type of local power range, monitor operation unit or average power range monitor operation unit are commonly integrated into a single unit per reactor protection system division.

There is further provided with bypass means for bypassing a plural signal processing start-up range neutron monitor operation function belonging to one of the reactor protection system divisions. There may be further provided with bypass means for bypassing an average power range monitor operation function belonging to one of reactor protection system divisions. There may be further provided with bypass means for bypassing an integrated monitor operation unit belonging to one of reactor protection system divisions and for simultaneously bypassing an average power range monitor operation function and a plural signal processing start-up range neutron monitor operation function.

There may be further provided with a automatic correction means for correcting a start-up range neutron monitor output obtained as a result of operating a start-up range neutron monitor signal using an average power range monitor output which is a result of averaging operation of said average power range monitor operation unit, and may further provided with a reactor run mode monitoring means for inputting and monitoring a state of a reactor mode switch and automatic correction means for correcting a start-up range neutron monitor output and for making the start-up range neutron monitor output coincident with an average power range monitor output when a reactor mode is switched from start-up to operation or operation to start-up.

Alarm determining means may be further provided for determining whether an average power range monitor output reaches a downscale alarm value and automatic correction means for correcting the start-up range neutron monitor output using a signal of the alarm determining means and for making the start-up range neutron monitor output coincident with the average power range monitor output. In an alternation, alarm determining means may be provided for determining whether an average power range monitor output reaches an upscale alarm value in a mode other than reactor operation mode and automatic correction means for correcting the start-up range neutron monitor output using a signal of the alarm determining means and for making the start-up range neutron monitor output coincident with the average power range monitor output.

There may be further provided with automatic correction means for inputting a signal of a local power range monitor detector arranged closest to the start-up range neutron monitor detector into the average power range monitor operation unit into which a signal of the start-up range neutron monitor detector is inputted and for correcting the start-up range neutron monitor output using a local power range monitor output obtained from an operation result of operating the local power range monitor detector signal. In an alternation, there may be provided automatic correction means for taking in a reactor operating parameter and calculating an output distribution in the reactor using a three-dimensional BWR simulation function incorporated into a reactor core performance monitoring unit connected to calibrating means, for obtaining and transmitting a value read by a start-up range neutron monitor detector from the power output distribution calculation result, for correcting a start-up range neutron monitor output and for making the start-up range neutron monitor output coincident with the read calculation value.

Furthermore, a plurality of neutron flux detector assemblies, each incorporating a start-up range neutron monitor detector, are arranged in the vicinity of a center of a reactor core, the number of the neutron flux detector assemblies being the same as the number of reactor protection system divisions, the neutron flux detector assemblies, the number of which is twice or more of the number of reactor protection system divisions, are arranged on a peripheral portion surrounding the neutron flux detector assemblies arranged in the vicinity of a center of the reactor core, and further comprising start-up range neutron monitor detector bypass groups, the number of which is the same as the number of the reactor protection system divisions, including a set of a start-up range neutron monitor detector incorporated into one neutron flux detector assembly in the vicinity of a center and the start-up range neutron monitor detector incorporated into two or more neutron flux detector assemblies on the peripheral portion, the start-up range neutron monitor detectors being allotted to the reactor protection system divisions with the same groups as the bypass groups.

There may be further provided with bypass means for bypassing an operating, indicating and monitoring function for an optional one of signals from start-up range neutron monitor detectors belonging to the same reactor protection system division.

According to the above first aspect of the present invention, it is made unnecessary to install a start-up range neutron monitor detector solely in a reactor pressure vessel by integrating the start-up range neutron monitor detector and the local power range monitor detector assembly into a single detector assembly and installing these detectors into the reactor pressure vessel. Accordingly, it becomes possible to reduce the number of neutron detector assemblies, neutron detector installation flanges and neutron detector guide tubes installed in the reactor pressure vessel.

According to the second aspect of the present invention, it is made unnecessary to install a start-up range neutron monitor detector solely in a reactor pressure vessel by incorporating the local power range monitor detector, start-up range neutron monitor detector and calibrating means into a single cover tube and installing them into the reactor pressure vessel. Accordingly, it becomes possible to reduce the number of neutron detector assemblies, neutron detector installation flanges and neutron detector guide tubes arranged in the reactor pressure vessel.

Furthermore, according to the preferred embodiments of the above first and second aspect, the following advantageous functions and effects will be achieved.

The number of operation units can be reduced by integrating the local power range monitor operation unit and the start-up range neutron monitor operation unit.

It becomes possible to continuously monitor the reactor power level from the reactor start-up to power output operation using one operation unit, thereby enhancing monitoring performance. The number of the start-up range neutron monitor detectors arranged in the reactor pressure vessel is increased to make allowable number of bypassed detectors four, and four bypass groups are provided. Since the neutron flux detector assembly incorporating a start-up range neutron monitor detector is applied and installed in the reactor pressure vessel, the number of neutron detector assemblies arranged in the reactor does not increase. Moreover, by making the bypass groups for the start-up range neutron monitor identical to the reactor protection system divisions, operators can avoid feeling confused during the bypass operation and labor can be thereby reduced.

Furthermore, by coating the start-up, range neutron monitor detector with an insulating layer resistant to the environment within the reactor pressure vessel, the start-up range neutron monitor detector can be installed in the reactor so as not to contact the detector with reactor water as in the case of a conventional state in which the start-up range neutron monitor detector is installed in the reactor, and noise can be prevented from entering the start-up range monitor. Still furthermore, by applying, in particular, alumina to this insulating layer, it is possible to isolate the start-up range neutron monitor detector from reactor water.

Still furthermore, by installing the start-up range neutron monitor detector in the hollow tube of a small diameter, the start-up range neutron monitor detector can be installed in the reactor so as not to contact the detector with reactor water as in the case of the conventional state in which the start-up range neutron monitor detector is installed in the reactor, and noise can be prevented from entering the start-up range monitor. Moreover, by using, in particular, stainless steel for this hollow tube, it becomes possible to isolate only the start-up range neutron monitor detector from reactor water.

Still furthermore, by performing a plurality of arithmetic operations altogether for every section, it is possible to reduce the number of detectors without increasing the number of operation units and to operate the detectors and operation units for every reactor protection system division, thereby facilitating the operation and maintenance.

Still furthermore, it becomes possible to reduce the number of operation units and to continuously monitor the reactor power level from the reactor start-up to power output operation using a single operation unit. Thus, not only monitoring performance enhances but also the number of detectors can be increased without increasing the number of operation units due to the fact that a plurality of arithmetic operations are performed altogether for every section. In addition, it is possible to operate the detectors and operation units for every division (section), thereby facilitating the operation and maintenance.

Still furthermore, by increasing the number of start-up range neutron monitor detectors installed in the reactor pressure vessel, it is possible to bypass, maintain and test all the start-up monitoring functions in one division without adversely influencing the function of the start-up range monitors as the reactor protection system division.

Still furthermore, it becomes possible to bypass, maintain and test all the average power range monitoring function in one section without adversely influencing the function of the average power range monitors as the reactor protection system.

Still furthermore, it becomes possible to carry out the maintenance and testing without adversely influencing the function of the neutron flux measuring apparatus as the reactor protection system divisions by bypassing the operation unit in the divisions.

Still furthermore, by providing the automatic correction means, adjustment operation by operators or maintenance personnel for correcting the start-up range monitor output as required in the conventional case is made unnecessary, thereby greatly enhancing operability and maintenability.

Still furthermore, it becomes possible to monitor reactor power outputs as continuous values before or after an operator switches the reactor mode, thereby enhancing monitoring performance.

Still furthermore by correcting the irregularity of directions for the start-up range neutron monitor output before the reactor mode switching operation using the alarm determining means at a time when the power output of the reactor is rising, the output range, in which the reactor mode can be switched, is widened and operability is enhanced.

Still furthermore, by correcting the irregularity of the start-up range monitoring direction when the reactor output power decreases before the switching operation of the reactor run mode, the power output range, in which the reactor mode can be switched, is widened and operability is enhanced.

Still furthermore, the reliability in the monitoring of local power output using the start-up range monitor output enhances. The start-up range monitor outputs including sensitivity change due to the irradiation of a fission detector in the reactor can be corrected.

Still furthermore, by installing the detectors in different reactor divisions in the vicinity of the center, detectors in different divisions are arranged in the vicinity of the center during the section (division) bypassing. Accordingly, it becomes possible to monitor the overall reactor without adversely influencing reactor emergency shutdown function. In addition, by two or more detectors per detector bypass group are arranged on the peripheral portion so as to compensate for the monitoring range of the detectors in the vicinity of the center while all of the detectors in the vicinity of the center are bypassed, it becomes possible to monitor the overall reactor and the operability can be hence enhanced.

Still furthermore, up to one start-up range neutron monitor detector per reactor protection system division is permitted to be bypassed, whereby the operators and maintenance personnel can easily manage, monitor and operate the detector bypassing for every protection system division for the start-up range neutron monitor.

Finally, in the 'start-up' mode, the scram function executed by the start-up range neutron monitor is the most important among the reactor protection system functions In the run (operation) mode, the scram function executed by the average power range monitor is the most important among the reactor protection system functions. Thus, their response is significant. According to the present invention, which is provided with calculation frequency switching means, it is possible to obtain a neutron flux measuring apparatus without adversely influencing the above-mentioned functions even if the operation unit in the neutron flux measuring apparatus is shared by the start-up range neutron monitor and the power range monitor.

The nature and further characteristic features of the present invention will be made more clear from the following descriptions made with reference to the accompanying drawings.

DESCRIPTION OF THE PREFERRED EMBODIMENTS

Preferred embodiments of a neutron flux measuring apparatus according to the present invention will be described hereunder with reference to FIGS. 1 through 11.
First Embodiment (FIGS. 1 Through 4)
In this embodiment, description will be given to a neutron flux measuring apparatus in which detectors and operation units (arithmetic processing unit) are commonly used to thereby reduce the number of necessary detectors and operation units.

Figure 1:
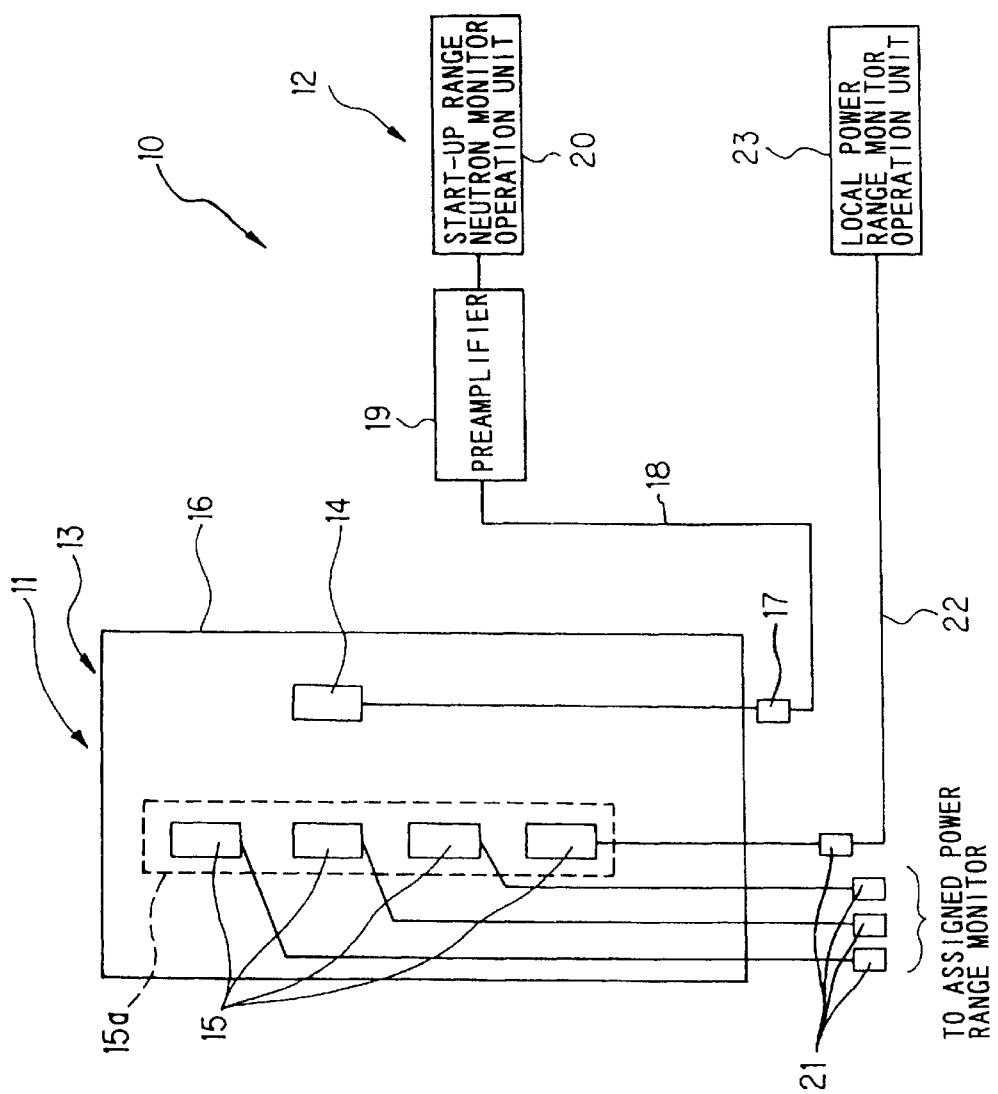
FIG. 1 is a view of a system diagram of a neutron flux measuring apparatus incorporating local power range monitor detectors (monitors) and start-up range neutron monitor detectors (monitors) according to the present invention.

FIG. 1 shows the system diagram of a neutron flux measuring apparatus incorporating local power range monitor (to be referred to as 'LPRM' hereinafter) detectors and start-up range neutron monitor (to be referred to as 'SRNM' hereinafter) detectors therein.

As shown in FIG. 1, the neutron flux measuring apparatus 10 is composed of a detecting section 11 measuring neutron flux and an operation processing section 12 arithmetically processing a signal obtained from the detecting section 11.

The detecting section 11 comprises a neutron flux detector assembly 13 in which an SRNM 14 measuring a low power range, four LPRM detectors 15 measuring high power ranges are vertically arranged in parallel to the SRNM detector 14 in the axial direction of a reactor core, which detectors 15 form an LPRM detector assembly 15a as a whole. The SRNM detector 14 and the LPRM detector assembly 15a are incorporated in a cover tube 16 having a plurality of holes for introducing reactor water and form a neutron flux detector assembly 13 as a whole.

The operation processing section 12 comprises two portions, i.e., a portion arithmetically processing a detector signal from the SRNM detector 14 and a portion arithmetically processing detector signals from the LPRM detector assembly 15a.

An SRNM detector cable 18 is connected to the SRNM monitor detector 14 through an SRNM detector connector 17. A preamplifier 19 amplifying a power output signal obtained from the SRNM detector 14 is connected to the SRNM detector cable 18, and an SRNM operation unit 20 operating, indicating and monitoring the amplified signal from the SRNM detector 14 is installed in the later stage of the preamplifier 19, which SRNM operation unit 20 operates neutron fluxes, reactor core power and the like.

On the other hand, LPRM detector cables 22 are connected to the four LPRM detectors 15 through LPRM detector connectors 21, respectively. In addition, an LPRM operation unit 23, which operates, indicates and monitors power output signals obtained from the LPRM detectors 15 through the LPRM detector cables 22, is installed, the operation unit 23 operating the transmitted signals into reactor core output power.

Figure 2:
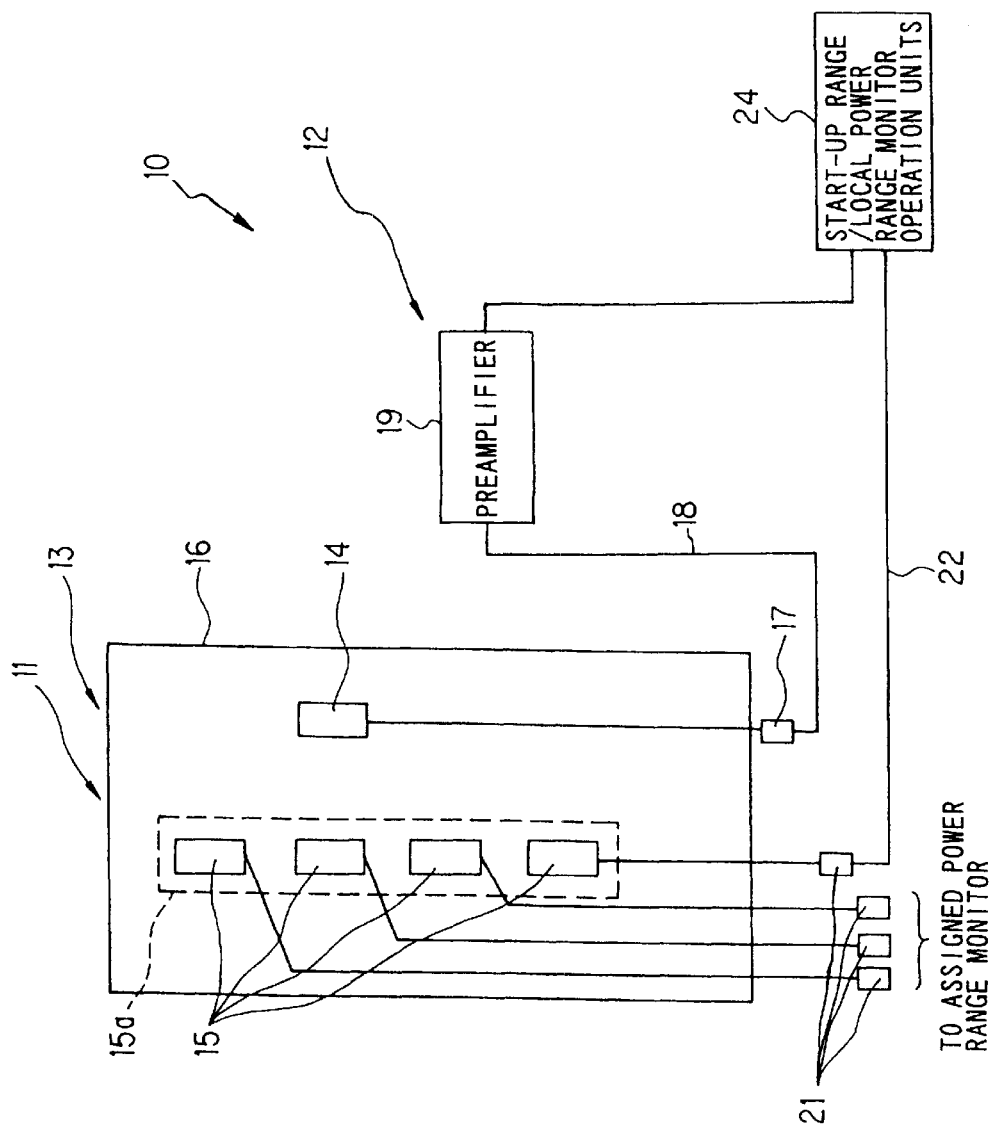
FIG. 2 is a view of a system constitution of a neutron flux measuring apparatus integrating start-up range neutron monitor operation units and local power range monitor operation units according to the present invention.

FIG. 2 shows the system diagram of the neutron flux measuring apparatus in which an SRNM operation unit and an LPRM operation unit are integrated.

The system diagram of the neutron flux measuring apparatus shown in FIG. 2 is almost the same as that of the neutron flux measuring apparatus shown in FIG. 1. A detecting section 11 in the neutron flux measuring apparatus 10 is exactly the same as the detecting section 11 shown in FIG. 1. The system of in FIG. 2 differs from that in FIG. 1 in that the SRNM operation unit 20 and the LPRM operation unit 23 shown in FIG. 1 are integrated into a single start-up range/local power range monitor operation unit 24 capable of performing both start-up range monitor operation and power range monitor operation in an operation processing section 12.

As shown in FIG. 2, an output signal from the SRNM detector 14 is fed to a preamplifier 19 through an SRNM detector cable 18 connected to the detector 14 through an SRNM detector connector 17. The detector signal amplified at the preamplifier 19 is fed to the start-up range/local power range monitor operation unit 24 which operates neutron flux and core output.

Meanwhile, an output signal from the LPRM detector 15 is fed to the start-up range/local power range monitor operation unit 24 through an LPRM detector cable 22 connected to the detector 15 through an LPRM detector connector 21 as in the case of the output signal from the SRNM detector 14. The signal thus fed is operated into reactor core power in the operation unit 24.

Figure 3:
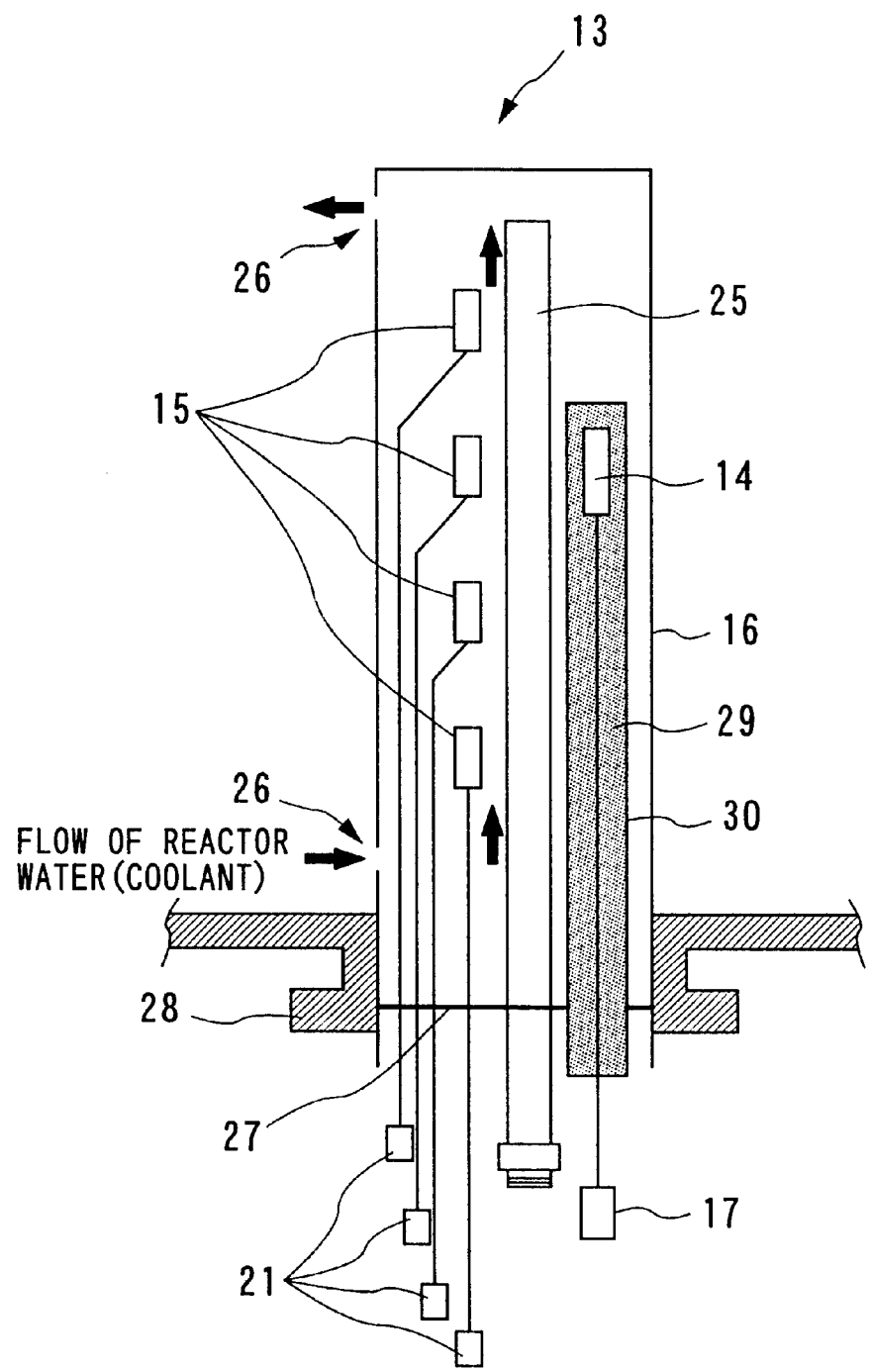
FIG. 3 is a view showing a detailed structure in a case where a neutron flux detector assembly is installed in a nuclear reactor according to the present invention.

FIG. 3 shows the detailed constitution of the neutron flux detector assembly 13.

As shown in FIG. 3, in the neutron flux detector assembly 13, an SRNM detector 14 measuring a low power range is installed and four LPRM detectors 15 measuring high power ranges are installed parallel to the SRNM detector 14 vertically in the axial direction of the reactor core. A calibration conduit 25 is provided in parallel to and between the SRNM detector 14 and the LPRM detectors 15.

The SRNM detector 14, the LPRM detectors 15 and the calibration conduit 25, which are incorporated into a cover tube 16 having a plurality of holes 26 for introducing reactor water, cool the LPRM detector 15. A reactor water seal section 27 is provided at the bottom of the cover tube 16 to prevent reactor water from leaking outside the reactor pressure vessel at the position of a flange for installing the neutron detectors.

Since the output signal of the SRNM detector 14 is very weak, it is necessary to ensure the electrical insulation of a circuit system. For this reason, an insulation layer 29 of alumina is provided on the outer periphery of the SRNM detector 14 and a stainless steel envelope 30 is provided on the outer periphery of the insulation layer 29 up to below the reactor water seal section 27 at the position of a neutron detector housing 28, so as not to contact the circuit system to the reactor water or the like.

Figure 4:
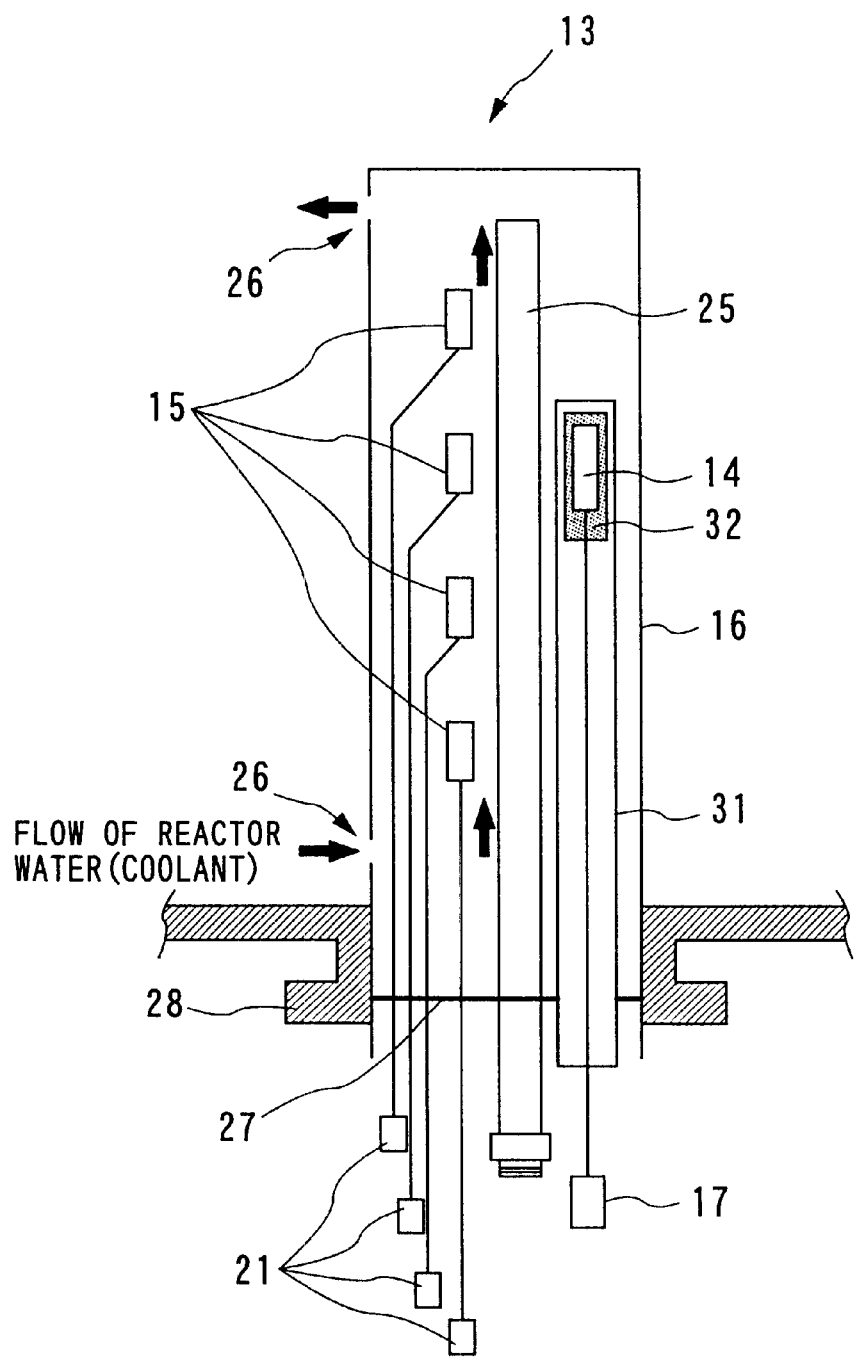
FIG. 4 is an another detailed view showing the structure of a neutron flux detector assembly according to the present invention.

FIG. 4 is the detailed view showing another structure of the neutron flux detector assembly 13, which is substantially the same as that of the neutron flux detector assembly 13 shown in FIG. 3. The assembly in FIG. 4 differs from that in FIG. 3 in the arrangement of an SRNM detector 14.

As shown in FIG. 4, a small-diameter hollow tube 31 of stainless steel penetrating below a reactor water seal section 27 at the position of a neutron detector housing 29 is provided in a neutron flux detector assembly 13. The SRNM detector 14 is installed in the hollow tube 31. In order to ensure the insulation between the SRNM detector 14 and the small-diameter hollow tube 31, the outer periphery of the SRNM detector 14 is coated with a thin insulating material 32 of alumina ceramics.

According to this embodiment, the SRNM detector 14 and the LPRM detectors 15 are incorporated into a single cover tube 16 and installed in a reactor vessel, and therefore, it makes possible to measure neutron fluxes in all ranges necessary to monitor the nuclear reactor even if the number of detector assemblies is reduced.

In addition, the SRNM operation unit 20 and the LPRM operation unit 23 are integrated into a single start-up range/local power range monitor operation unit 24 capable of performing both start-up range monitor operation and power range monitor operation, thereby making it possible to reduce the number of monitor operation units.

Furthermore, as shown in FIG. 3, by coating the outer periphery of the SRNM detector 14 with an insulation layer 29 and an envelope 30, reactor water can be prevented from entering the insulating layer 29 and the electrical insulation of the SRNM detector 14 can be maintained. Still furthermore, since the hollow tube 31 installed on the outer periphery of the SRNM detector 14 is formed of stainless steel, it is possible to isolate only the SRNM detector 14 from reactor water.

It is noted that a calibration conduit 25 is installed in the neutron flux detector assembly 13 of the conventional neutron flux measuring apparatus 10. The calibration conduit 25 is not described in detail kin this embodiment. However, an n-TIP detector or γ-TIP detector, which has been already put to practical use, is pulled and moved in axial direction and measures axial power distribution thereby to allow the calibration of the LPRM detectors. A fixed gamma thermometer assembly already proposed may be installed instead of the calibration conduit 25 to calibrate the LPRM detectors.

Second Embodiment (FIG. 5)

In this embodiment, a neutron flux measuring apparatus in which bypass groups are made identical to reactor protection system divisions (sections) will be described.

FIG. 5 shows the arrangement of SRNM detectors at a reactor core in an advanced boiling-water reactor (ABWR) nuclear power plant.

Figures 5A, 5B:
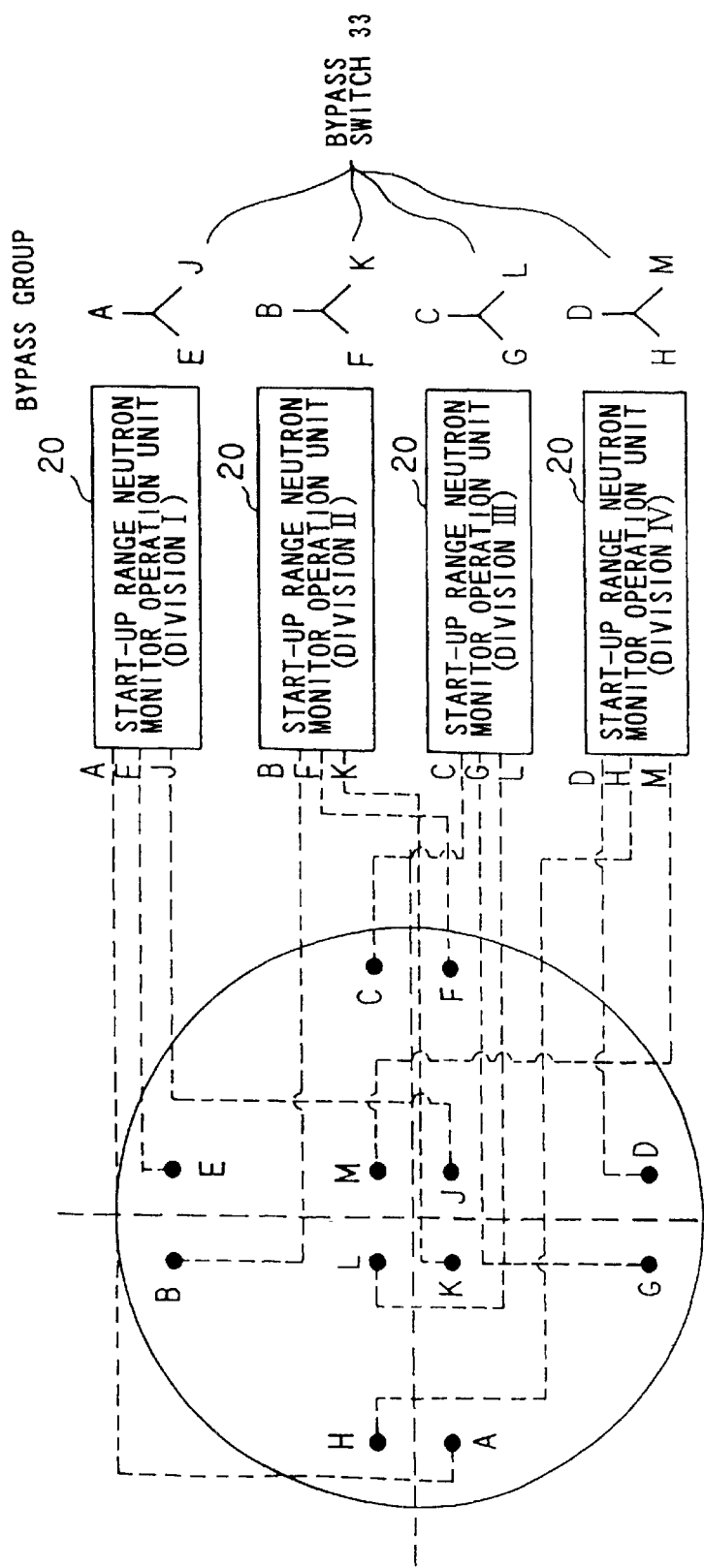
FIG. 5 is a view showing an arrangement of start-up range neutron monitor detectors at a reactor core in an advanced boiling-water reactor (ABWR) nuclear power plant according to the present invention.

As shown in FIG. 5A, 52 LPRM detector assemblies, all of which are not shown therein, are installed in a reactor pressure vessel. Among 52 assemblies, twelve assemblies incorporate SRNM detectors, respectively, to form a neutron flux detector assembly 13 as a whole.

The twelve SRNM detectors (A, B, C, D, E, F, G, H, J, K, L, M) in the neutron flux detector assembly 13 are sectioned into four reactor protection system divisions each including three ones. Specifically, the SRNM detectors (A, E, J) are in the division I, the SRNM detectors (B, F, K) are in the division II. The SRNM detectors (C, G, L) are in the division III and the SRNM detectors (D, H, M) are in the division IV.

One SRNM operation unit 20 installed per one reactor protection system division operates the three SRNM detectors.

Then, as shown in FIG. 5B, the bypass groups are made identical to the reactor protection system divisions and four bypass switches 33 are provided.

According to this embodiment, one channel detector which can be bypassed is present in each reactor protection system division, whereby the potential fear that operators may feel confused with the reactor protection system divisions and the bypass groups if the former are provided separately from the latter as seen in the conventional apparatus can be removed. In addition, if one SRNM operation unit 20 is provided per one reactor protection system division as stated above, it is possible to reduce the number of SRNM operation units 20.

Furthermore, if the SRNM operation unit 20 is designed to be able to process a plurality of channels, one monitor unit per one reactor protection system division suffices, whereby the number of monitor units can be reduced.

Third Embodiment (FIGS. 6 Through 9)

In this embodiment, description will be given to the system diagram of a neutron flux measuring apparatus having a plurality of neutron flux detector assemblies each of which includes SRNM detectors and a plurality of neutron flux detector assemblies each of which does not include SRNM detectors. This embodiment is aimed to reduce the number of elements by jointly or commonly using detector assemblies and operation units.

Figure 6:
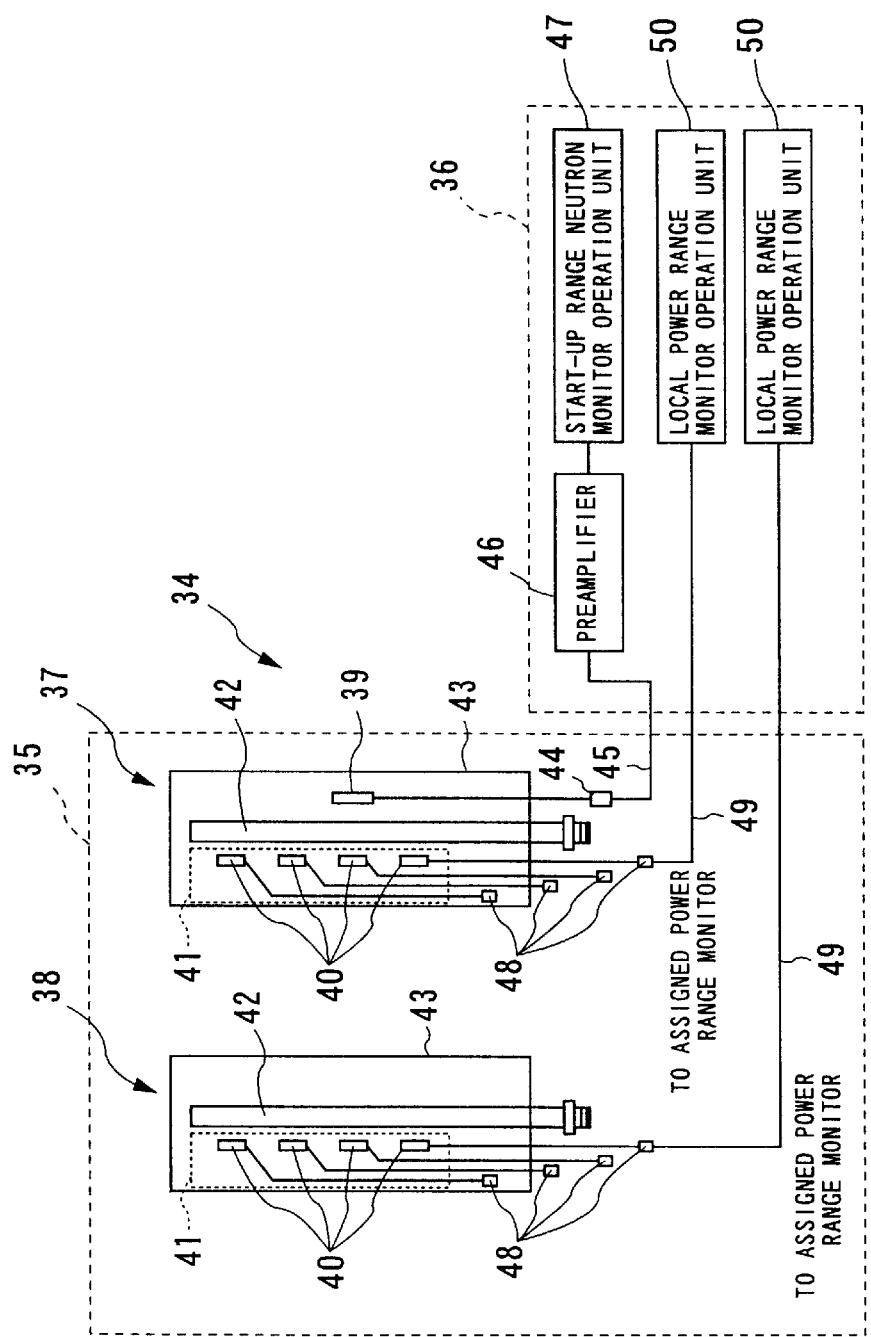
FIG. 6 is a view of a system diagram of a neutron flux measuring apparatus having a plurality of neutron flux detector assemblies according to the present invention.

FIG. 6 shows the system diagram of a neutron flux measuring apparatus having a plurality of neutron flux detector assemblies.

As shown in FIG. 6, the neutron flux measuring apparatus 34 is composed of a detecting section 35 measuring neutron flux and an operation processing section 36 arithmetically processing a signal obtained from the detecting section 35.

The detecting section 35 is composed of a neutron flux detector assembly 37 incorporating SRNM detector and a neutron flux detector assembly 38 not incorporating SRNM detector.

One SRNM detector 39 measuring a low power range is installed in the neutron flux detector assembly 37 incorporating an SRNM detector. Four LPRM detectors 40 measuring high power ranges are installed vertically in the axial direction of a reactor core and in parallel to the SRNM detector 39, which LPRM detectors 40 form an LPRM detector assembly 41 as a whole. The SRNM detector 39, the LPRM detector assembly 41 and a calibration conduit 42 parallel to the detector 39 and assembly 41 are arranged into a cover tube 43 having a plurality of holes for introducing the reactor water, which form the neutron flux detector assembly 37 as a whole.

Four LPRM detectors 40 detecting high power ranges are vertically installed in the axial direction of the reactor core in the neutron flux detector assembly 38 and form an LPRM detector assembly 41 as a whole. The LPRM detector assembly 41 as well as a calibration conduit 42 installed in parallel to the assembly 41 is incorporated into a cover tube 43 having a plurality of holes for introducing reactor water, which form the neutron flux detector assembly 38 as a whole.

The operation processing section 36 is composed of two portions, i.e., a portion arithmetically processing a detector signal from the SRNM detector 39 in the neutron flux detector assembly 37 and a portion arithmetically processing detector signals from the LPRM detector assemblies 41 in the neutron flux detector assembly 37 and the neutron flux detector assembly 38 which has the same structure as that of the conventional neutron flux detector assembly.

An SRNM detector cable 45 is connected to the SRNM detector 39 through an SRNM detector connector 44. A preamplifier 46 amplifying a power output signal obtained from the SRNM detector 39 to the SRNM detector cable 45. An SRNM operation unit 47 operating, indicating and monitoring the amplified signal from the SRNM detector 39 is installed in the later stage of the preamplifier 46, which unit 47 operates neutron fluxes, reactor core power and the like.

Meanwhile, LPRM detector cables 49 are connected to the four axial LPRM detectors 40 through LPRM detector connectors 48, respectively. An LPRM operation unit 50, which operates, indicates and monitors the power output signals obtained from the LPRM detectors 40 through the cables 49, operates the output signals into reactor core power.

Figure 7:
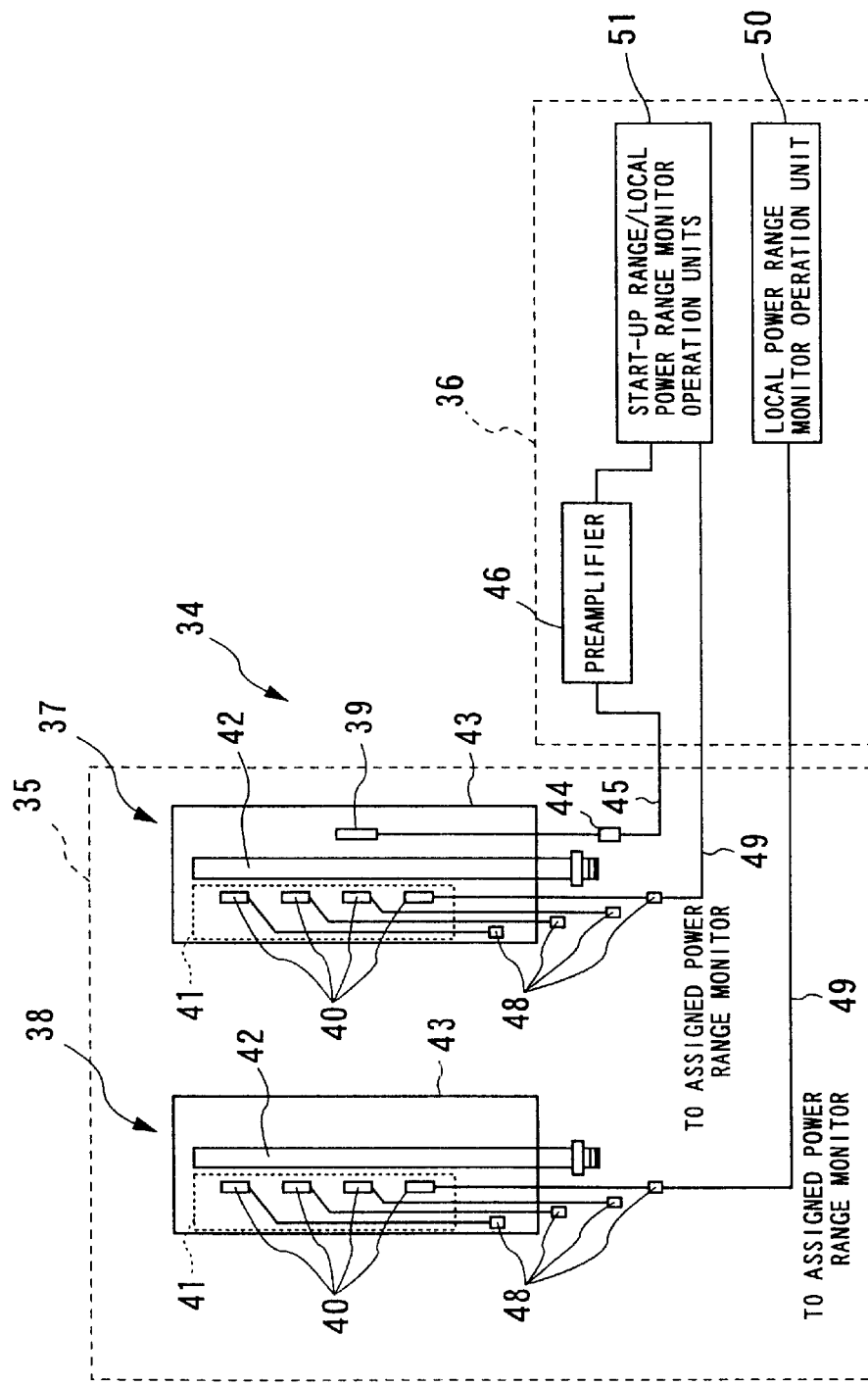
FIG. 7 is a view of a system diagram of a neutron flux measuring apparatus in which a start-up range neutron monitor operation unit and a local power range monitor operation unit are integrated according to the present invention.

FIG. 7 shows the system diagram of a neutron flux measuring apparatus in which an SRNM operation unit and an LPRM operation unit are integrated.

The system structure of the neutron flux measuring apparatus shown in FIG. 7 is almost the same as that of the neutron flux measuring apparatus 34 shown in FIG. 6. A detecting section 35 in the neutron flux measuring apparatus is exactly the same as the detecting section 35 shown in FIG. 6. The neutron flux measuring apparatus in FIG. 7 differs from that in FIG. 6 in that the SRNM operation unit 47 and the LPRM operation unit 50 shown in FIG. 7 are integrated into a single start-up range/local power range monitor operation unit 51 which is capable of performing both SRNM operation and power range operation.

As shown in FIG. 7, an output signal from an SRNM detector 39 is fed to a preamplifier 46 through an SRNM detector cable 45 connected to the detector 39 through the SRNM detector connector 44. The detector signal amplified at the preamplifier 46 is fed to the start-up range/local power range monitor operation unit 51, in which an SRNM operation unit directing and monitoring an output signal operates neutron fluxes, periods, reactor core power and the like.

On the other hand, output signals from a plurality of LPRM detectors 40 are fed to the start-up range/local power range monitor operation unit 51 through LPRM detector cables 49 connected to the LPRM detectors 40 by LPRM detector connectors 48 through LPRM detector cables 49, respectively, as in the case of the output signal from the SRNM detector 39. The signals thus fed are operated into reactor core power by the operation unit 51.

It is noted that the SRNM detector used for SRNM operation in the operation unit 51 and the LPRM detectors belong to the same reactor protection system divisions and detector signals from detectors in different reactor protection system divisions are not mixed thereinto.

One SRNM detector signal and a plurality of LPRM detector signals may be inputted to the operation unit 51. Alternatively, a plurality of SRNM detector signals and a plurality of LPRM detector signals may be inputted thereto. Furthermore, the operation unit 51 can be designed to perform bypass processing for each SRNM detector and LPRM detector, not to output the respective detector signals to the later stage or to transmit a bypass signal to allow signals to be ignored in the later stage.

Figure 8:
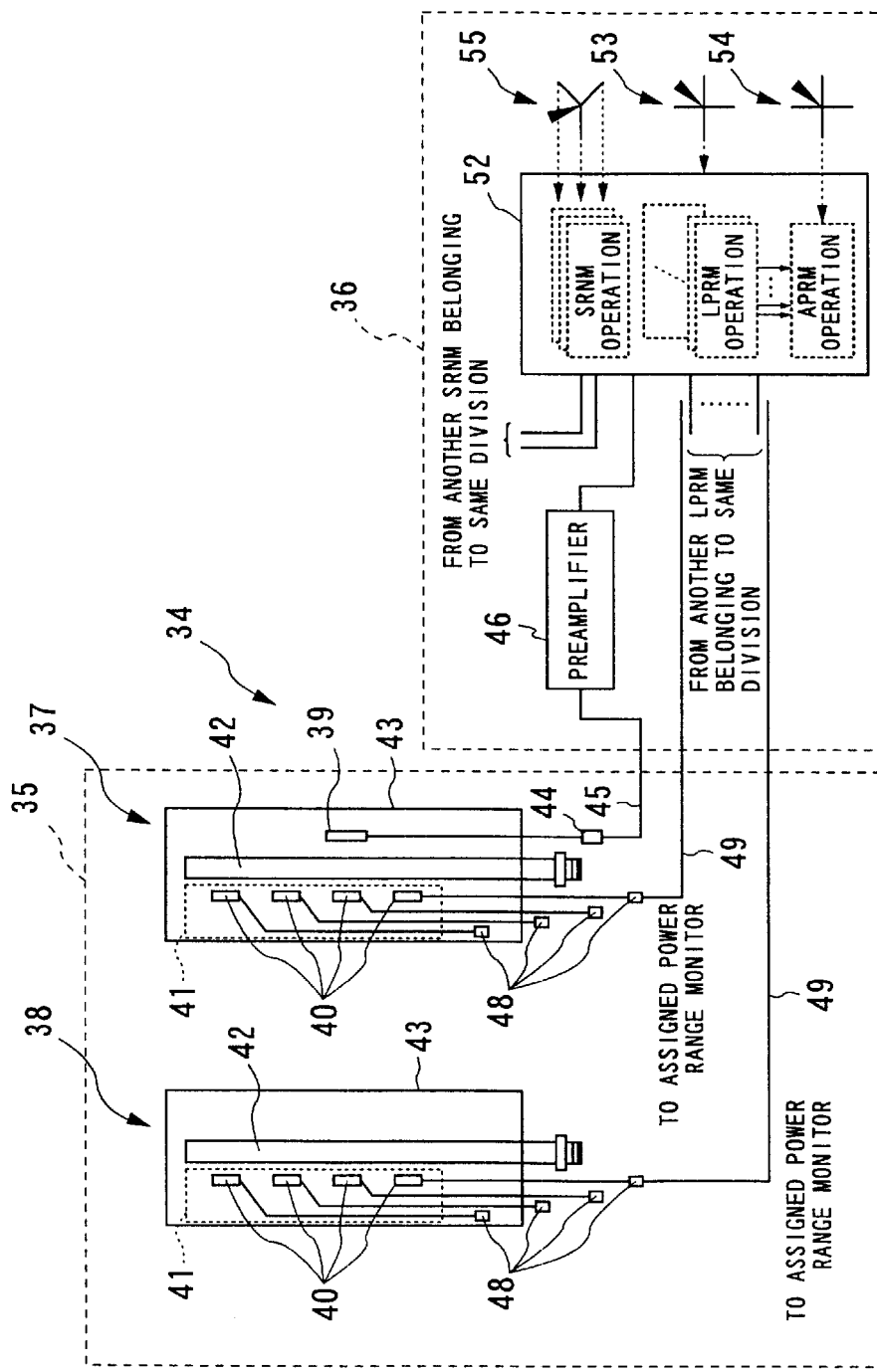
FIG. 8 is a view of a system diagram of a neutron flux measuring apparatus, which is a modification to the apparatus of FIG. 7, having an integrated operation unit executing start-up range neutron monitor function and average power range monitor function according to the present invention.

FIG. 8 shows another example of the structure of FIG. 7 and shows a neutron flux measuring apparatus in which an operation unit which executes both SRNM function and APRM function is commonly used.

The system structure of the neutron flux measuring apparatus 34 shown in FIG. 8 is almost the same as that of the neutron flux measuring apparatus 34 shown in FIG. 6. A detecting section 35 in the neutron flux measuring apparatus 34 is exactly the same as the detecting section 35 shown in FIG. 6. The apparatus 34 in FIG. 8 differs from that in FIG. 6 in a point that, in the arithmetic processing section 36, the SRNM operation unit 47, the LPRM operation unit 50 both shown in FIG. 6 and an average power range monitor (to be referred to as 'APRM' hereinafter) operation unit are integrated into a single SRNM/LPRM/APRM operation unit (full range monitor operation unit) 52 which is capable of performing three operations, i.e., SRNM operation, power range monitor operation and average output range monitor operation.

As shown in FIG. 8, an output signal from the SRNM detector 39 is fed to a preamplifier 46 through an SRNM detector cable 45 connected to the detector 39 through an SRNM detector connector 44. The detector signal amplified at the preamplifier 46 is fed to the full range monitor operation unit 52. The full range monitor operation unit 52 operates neutron flux, period, reactor core power and the like for the indication and monitoring of the unit 52.

On the other hand, output signals from LPRM detectors 40 are fed to the full range monitor operation unit 52 through LPRM detector cables 49 connected to the detectors 40 through LPRM detector connectors 48, respectively, as in the case of the output signal from the SRNM detector 39. The signals thus fed are standardized and operated to local power level (multiplied by a gain adjustment factor) in the full range monitor operation unit 52. Further, the LPRM detector signals are averaged and converted to reactor core outputs to thereby turn into APRM signals.

It is noted that the SRNM detector used for SRNM operation in the full range monitor operation unit 52 and the LPRM detectors belong to the same reactor protection system division and the detector signals from detectors in different reactor protection system divisions are not mixed thereinto.

The full range monitor operation unit 52 can be designed to perform bypass processing for each SRNM detector and LPRM detector, not to output the respective detector signals to the later stage or to transmit a bypass signal to allow signals to be ignored in the later stage.

The overall full range monitor operation unit 52 can be designed to be bypassed for the purposes of the maintenance of the equipment and to output a bypass signal of a corresponding channel to a reactor protecting system logic circuit in a later stage, which are not shown, thereby allowing abnormal data from the full range monitor operation unit 52 to be ignored in the later stage (which bypassing is hardware bypass means and will be referred to as 'hard-bypass' hereinafter).

The hard-bypass of the full range monitor operation unit 52 includes an APRM function bypass. If a plurality of operation units are bypassed, scram feature sometimes does not operate normally. For this reason, there is provided an operation unit section (division) bypass switch 53 outside the full range monitor operation unit 52 to select the division (section) of the full range monitor operation unit 52 to perform hard bypassing. This operation unit section bypass switch 53 is designed to select only one section and only the full range monitor operation unit 52 which has received a selection signal from the operation unit section bypass switch 53 can be hard-bypassed.

Additionally, the full range monitor operation unit 52 can perform functional bypassing (which is not hardware bypass of the overall unit but bypass by means of software processing and will be referred to as 'soft-bypass' hereinafter) so as to allow only one of the SRNM function and the APRM function to be ignored by the reactor protection system logic circuit in the later stage.

Among the soft-bypasses, the APRM function bypass is allowed for only one division as in the case of the hardware bypass and, therefore, an APRM section bypass switch 54 for selecting a section (division) to perform functional bypass is provided. The SRNM function bypass is allowed one channel a piece for each detector bypass group and, therefore, an SRNM detector bypass switch 55 for selecting a detector channel to perform function bypass is provided. Only the operation unit which has received a selection signal from the respective bypass switches can perform bypassing of the selected function.

Figure 9:
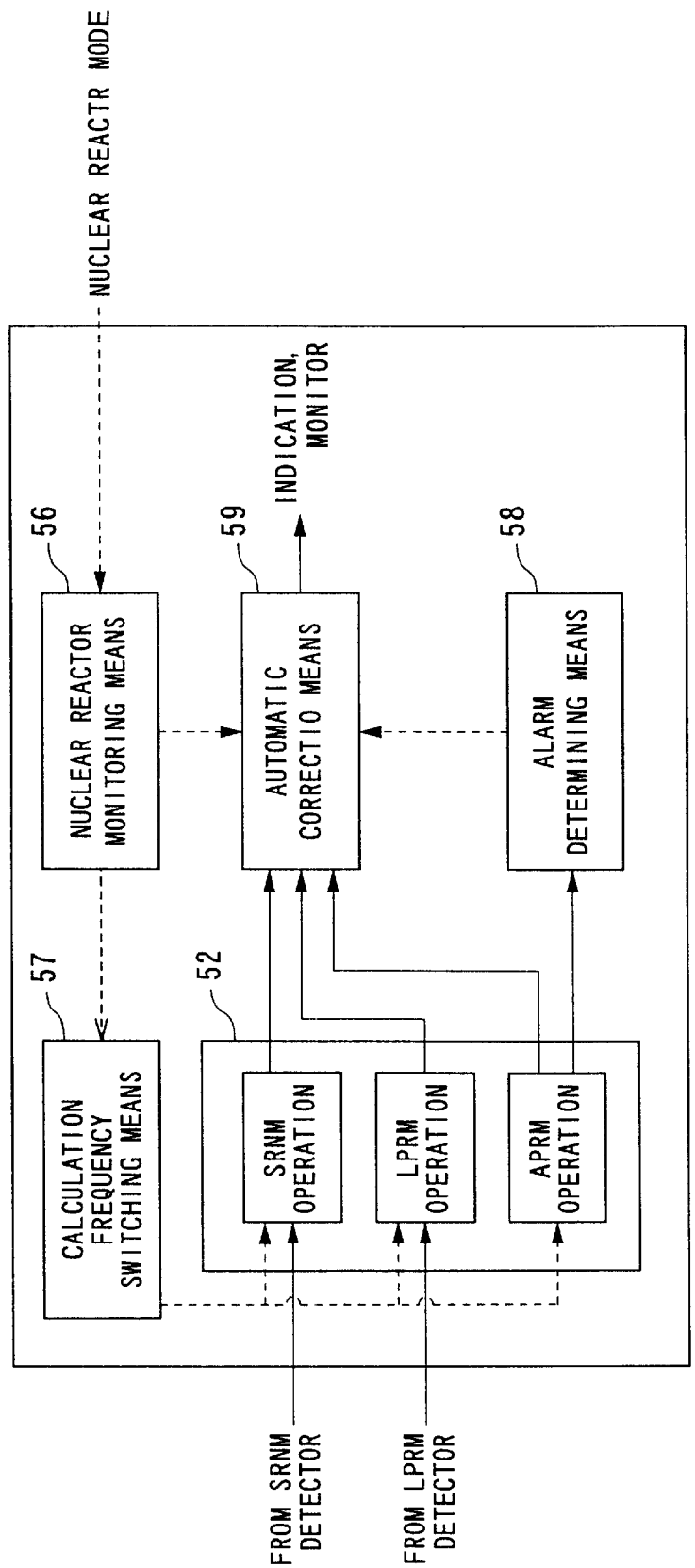
FIG. 9 is a view showing detail of a full range monitor operation unit according to the present invention.

Next, the detail of the full range monitor operation unit 52 is shown in FIG. 9. FIG. 9 shows only one channel representing SRNM detectors and LPRM detectors.

As shown in FIG. 9, the full range monitor operation unit 52 is provided with calculation frequency switching means 57 which receives a signal through reactor run (operation) mode monitoring means 56 from a reactor mode and switches the speed of the signal operation of the SRNM detector and that of the signal operation of the LPRM detectors in accordance with the reactor mode. This calculation frequency switching means 57 allows the SRNM detector signal processing to be carried out at high speed within a signal processing delay time required for the reactor protection system and LPRM detector signal processing to be executed in a slow cycle while the reactor is in "start-up" and "shutdown" modes. Conversely, while the reactor is in a "run" mode, LPRM detector signal processing is carried out at high speed within a signal processing delay time required for the reactor protection system, whereas the SRNM detector signal processing is carried out in a slow cycle.

Further, as shown in FIG. 9, the full range monitor operation unit 52 is provided with alarm determining means 58 for determining whether an APRM signal level is higher or lower than a predetermined level, and automatic correction means 59 for making SRNM output coincident with average APRM output based on the signal of the alarm determining means 58 and for automatically correcting the SRNM output. This automatic correction means 59 allows automatic switching at, for example, 15% power output. By providing the full range monitor operation unit 52 with the automatic correction means 59, if the APRM signal of the unit 52 reaches a downscale alarm value or an upscale alarm value while the reactor is in a mode other than "run" mode, the SRNM detector signal level can be automatically calibrated so as to be coincident with the APRM signal level.

Furthermore, this automatic correction means 59 functions to calibrate individual SRNM detector output signals such that the SRNM detector signal level is coincident with the APRM signal level of the full range monitor operation unit 52 by the operation from a full range monitor unit panel.

Furthermore, it is possible to automatically calibrate the SRNM detector signal level to be coincident with the APRM signal level when the state of the reactor mode switch is switched from "start-up" to "run" or from "run" to "start-up" by means of the automatic correction means 59.

At a timing of the calibration of these SRNM detector signal levels, the SRNM detector signal levels may be calibrated to be coincident with the signal level of the LPRM detector closest to the SRNM detector instead of calibrating them to be coincident with the APRM signal level.

According to this embodiment, by incorporating the SRNM detector 39 and the LPRM detector assembly 40 into a single cover tube 43 and installing them in the reactor vessel, it is possible to measure neutron fluxes in all ranges necessary to monitor the reactor even if the number of detector assemblies is reduced.

In a case of a future nuclear reactor, in particular, if a division (section) per fuel assembly increases, the portions in which neutron flux detector assemblies arranged to be surrounded by the four corners of the assembly decreases and it is difficult to install the LPRM detector assemblies and the SRNM detectors in positions surrounded by the four corners of another fuel assembly in the reactor core as in the conventional case, then it is necessary in prior art to install SRNM detectors at positions at which the LPRM detector assemblies are installed.

In principle, the LPRM detector assemblies are regularly arranged in the four corners of typically four control rod cells (unit cells constituting the reactor core in which four fuel assembly control rods are arranged to surround control rods of crisscross section) to surround the cells and local power outputs are equally measured throughout the reactor core. In a case of the BWR or ABWR, the arrangement becomes irregular. It is desirable that the LPRM detectors are arranged to equally surround the four control rod cells in light of use of control rod operation for reaction degree control, power distribution control during power output operation which are the characteristics of the BWR and ABWR. This embodiment can realize the arrangement.

As shown FIG. 7, since the SRNM operation unit 47 and the LPRM operation unit 50 are integrated into a single start-up range/local power range monitor operation unit 51 which is capable of performing both SRNM operation and LPRM operation, this embodiment allows the number of monitor operation units to be reduced.

As shown in FIG. 8, since the SRNM operation unit 47, the LPRM operation unit 50 and further the APRM operation unit are integrated into a single full range monitor operation unit 52, the number of monitor operation units can be reduced.

In case of the conventional separate operation units, it is necessary to exchange data among the operation units to perform calibration and, therefore, necessary for operators or maintenance personnel to compare data and make adjustment or to add data input/output terminals. According to this embodiment, by contrast, at the time of calibration for matching SRNM detector signal levels with the power output range monitor detector signal levels, they can be easily calibrated using the APRM signal or LPRM detector signals within the same full range monitor operation unit 52, so that the calibration can be executed by soft ware within a single full range monitor operation unit 52.

Fourth Embodiment (FIG. 10)

In this embodiment, description will be given to a neutron flux measuring apparatus in which bypass groups are made identical to reactor protection system divisions.

FIG. 10 shows the arrangement of twelve neutron flux detector assemblies incorporating SRNM detectors are installed at a reactor core in an advanced boiling-water reactor (ABWR) nuclear power plant.

Figures 10A, 10B:
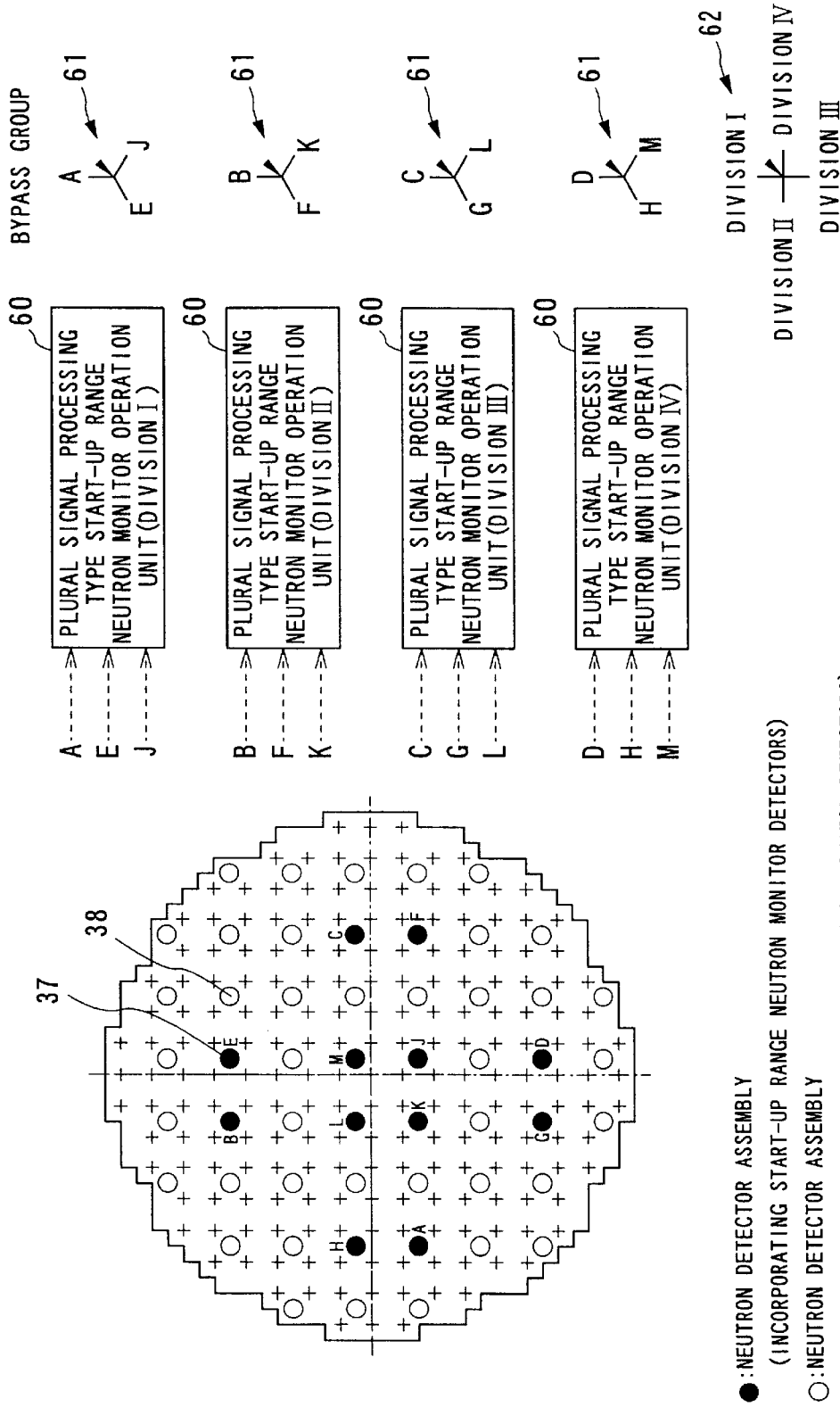
FIG. 10 is a view showing an arrangement of twelve neutron flux detector assemblies incorporating start-up range neutron monitor detectors at a reactor core in an advanced boiling-water reactor (ABWR) nuclear power plant according to the present invention.

As shown in FIG. 10A, 52 LPRM detector assemblies 41 are installed in a reactor pressure vessel. Among those 52 assemblies, 12 (twelve) assemblies which incorporate SRNM detectors 39 are denoted as neutron flux detector assemblies 37 and the remaining ones are denoted as neutron flux detector assemblies 38 which do not incorporate SRNM detectors. Symbols added to the neutron flux detector assemblies 37 indicate SRNM detector channels.

The twelve SRNM detectors (A, B, C, D, E, F, G, H, J. K, L, M) are sectioned into four reactor protection system divisions (sections) each including three ones.

Specifically, the SRNM detectors (A, E, J) are in the division I and the SRNM detectors (B, F, K) are in the division II. The SRNM detectors (C, G, L) are in the division III and the SRNM detectors (D, H, M) are in the division IV.

Here, four detectors in the vicinity of the center of the reactor core are allotted to different sections and denoted by (J, K, L, M), respectively. The remaining detectors (A, E) in the division I are arranged at peripheral portions of the regions, among the sector regions obtained by quadrisecting the reactor core on a plane, adjacent to the range in which the detectors J is arranged to be close to a region diagonal to the detectors J, respectively. The remaining detectors (B, F) in the division II, the remaining detectors (C, G) in the division III and the remaining detectors (D, H) are arranged in regions with respect to K, L and M, respectively as in the same manner as the detectors (A, E).

Furthermore, a plural signal processing type SRNM operation unit 60 for operating three SRNM detectors is installed per reactor protection system division.

Then, as shown in FIG. 10B, the detector bypass groups are made identical to the reactor protection system divisions and a detector bypass switch 61 bypassing one out of the three detectors is provided for each of the four bypass groups.

Further, in the SRNM monitor operation unit of processing a plurality of signals, an operation unit section bypass switch 62 bypassing one operation unit is provided.

According to this embodiment, one detector channel which can be bypassed is present per reactor protection system division, whereby the potential fear that operators may feel confused as seen in the conventional case where the reactor protection system divisions and the bypass groups are provided separately, can be removed.

In addition, as shown in FIG. 10, four detectors (J, K, L, M) in different sections are arranged in the vicinity of the center. For this reason, even if the section bypassing is performed, the conventional conditions that monitoring ranges should correspond to the radius of the reactor core can be satisfied by the remaining detectors in the vicinity of the center. Further, even if all the detectors in the vicinity of the center are bypassed for the detector bypassing, it is possible to compensate for the monitoring ranges using the remaining peripheral detectors arranged in different sections.

Moreover, if the SRNM monitor operation unit is designed such that it can process a plurality of SRNM detector channels, one monitor operation unit per reactor protection system division suffices, thereby making it possible to reduce the number of the monitor operation units. Thus, while up to three out of the ten assemblies can be bypassed conventionally, up to six out of twelve neutron detector assemblies can be bypassed in this embodiment by arranging the twelve assemblies as described above and by combining the four detector bypass switches and operation unit section bypass switches. The operability and maintenability of the SRNM detectors and the operation units thereby enhance in this embodiment.

Additionally, according to this embodiment, compared with the conventional case where ten operation units are required, the number of operation units can be reduced to four even if detectors increase in number, thereby making cost reduction possible.

Therefore, according to this embodiment, the bypass groups for a single detector of the SRNM detectors are coincident to the reactor protection system divisions. For this reason, the present embodiment has an advantage in that the number of the SRNM detectors which can be bypassed within an integrated operation unit, can be maintained and the system can be, thereby, designed in a simpler manner.

As a modification to the neutron flux measuring apparatus in this embodiment, a plurality of full range monitor operation units including functions of the LPRM operation unit or APRM operation unit shown in FIG. 7 or 8, can be installed per reactor protection system division for multiplexing purposes.

In a case of such composed system, the switching function of the operating speeds of the SRNM operation and the operation of the power range monitors, the soft-bypass function having only one of the SRNM function and LPRM/APRM function, the bypassing of the overall integrated operation unit (hard-bypass function) and the SRNM detector signal level calibration function while the reactor is in the operating mode, can be realized.

Figure 11:
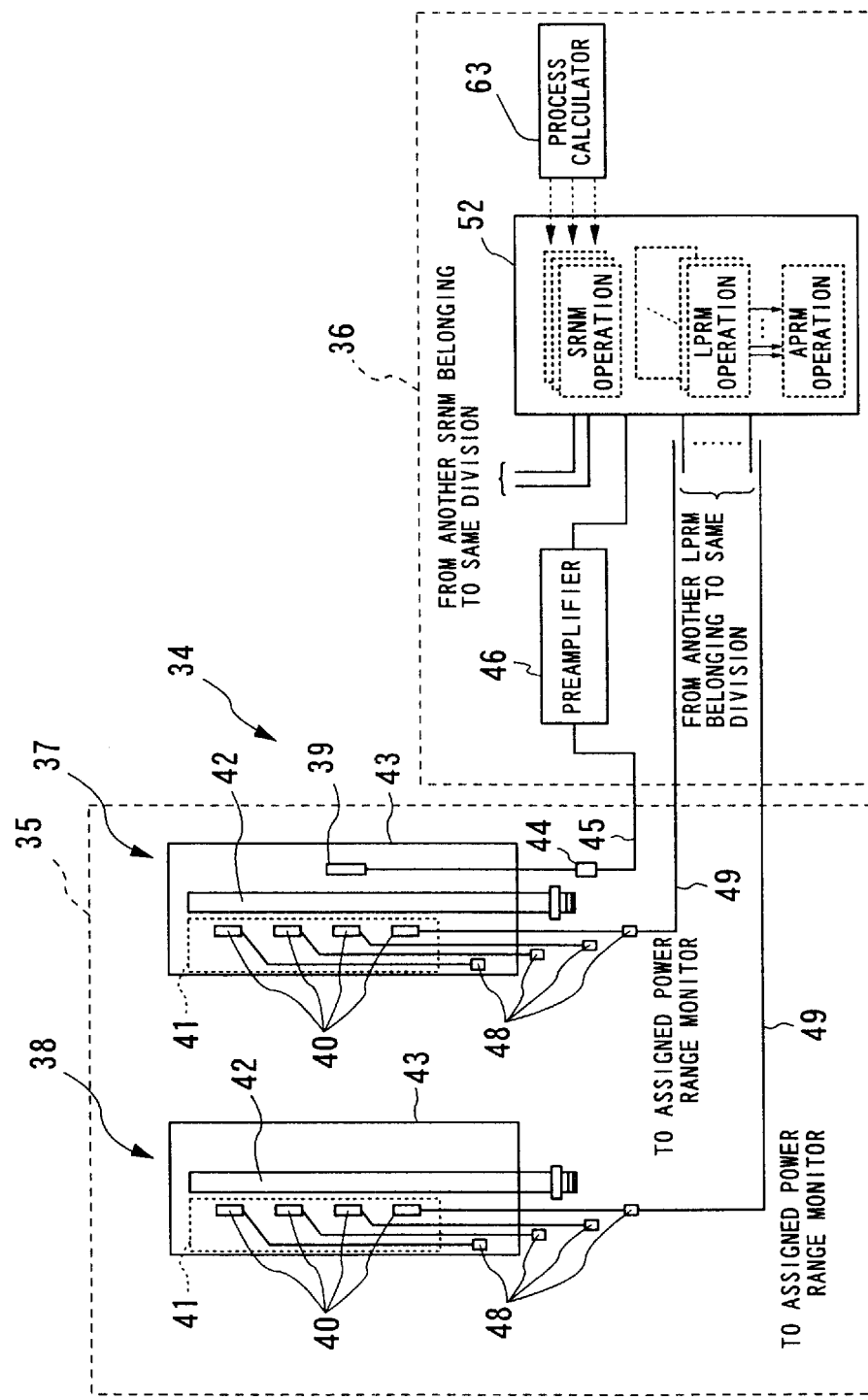
FIG. 11 is a detailed view showing a structure of a neutron flux detector assembly provided with a process calculator (operation unit) according to the present invention.
Figure 12:
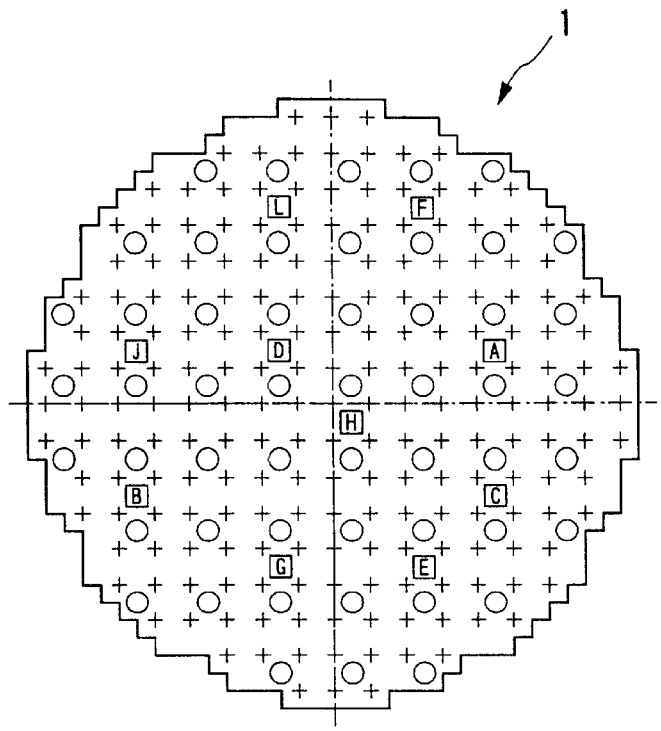
FIG. 12 is a view showing an arrangement of start-up range neutron monitor detectors and local power range monitor detector assemblies at a reactor core in a conventional advanced boiling-water reactor (ABWR) nuclear power plant.
Figure 13:
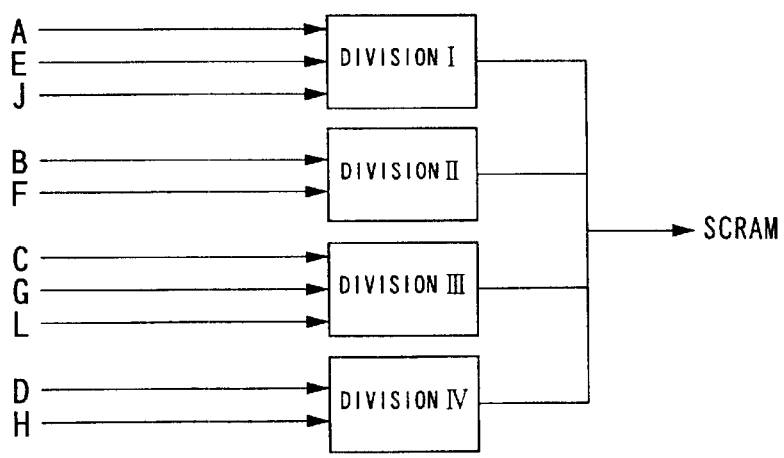
FIG. 13 is a view showing that start-up range neutron monitor detectors are divided into nuclear reactor protecting system separating sections according to the conventional apparatus.
Figure 14A:
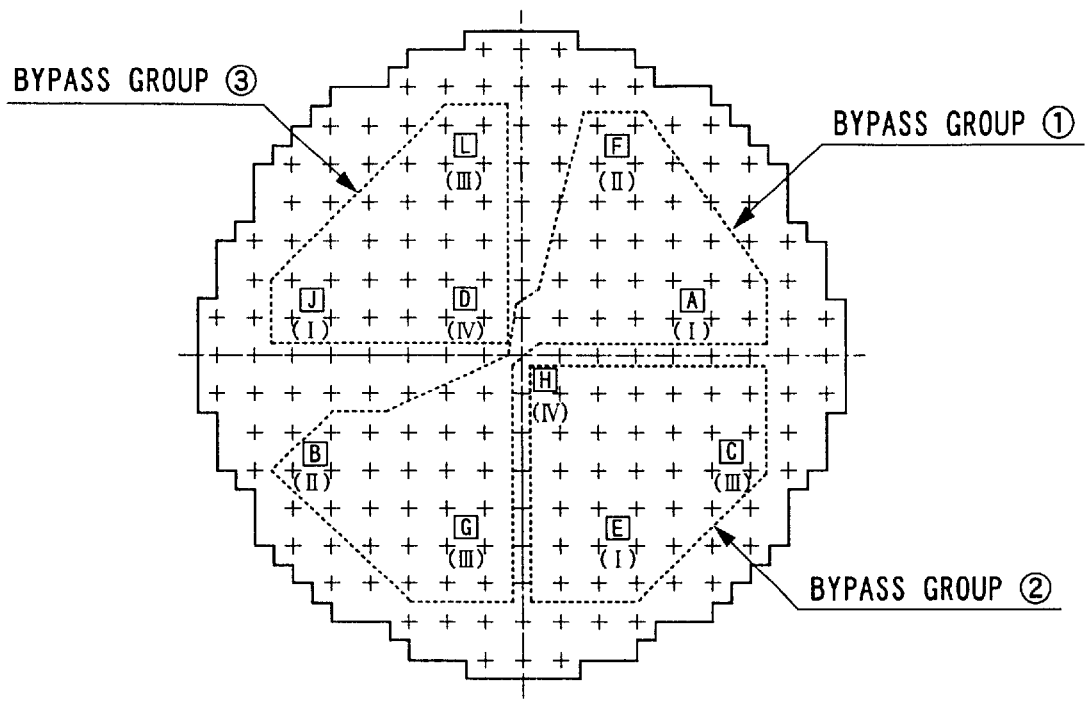
FIG. 14 is a view showing bypass groups of start-up range neutron monitor detectors according to the conventional apparatus.
Figure 14B:
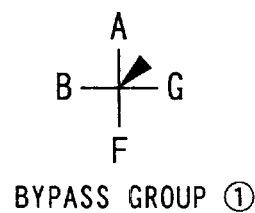
Figure 14B:
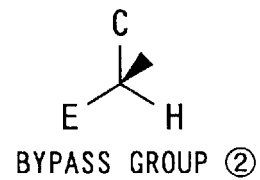
Figure 14B:
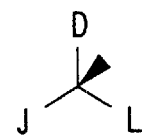

Fifth Embodiment (FIG. 11)

In this embodiment, description will be given to a neutron flux measuring apparatus provided with a process calculator serving as a reactor core performance monitoring unit.

FIG. 11 shows the constitution of a neutron flux measuring apparatus provided with a process calculator.

As shown in FIG. 11, the process calculator 63 serving as a reactor core performance monitoring unit inputs reactor core operation state parameters and reactor core measuring signals (LPRM, TIP, γ-TIP or gamma thermometer) and evaluates neutron flux distribution, power output distribution and the thermal limit parameter of a fuel assembly to be obtained from the power output distribution using three-dimensional BWR simulator codes incorporated in the process calculator 63.

Using an SRNM detector response level obtained at this process calculator 63, a correction factor for correcting sensitivity change due to the change in the concentration of uranium isotopes U-234, -235 coated on the interiors of an actual SRNM detector, which change occurs to the SRNM detector, is calculated and the calculated value is fed to the full range monitor operation unit 52, thereby multiplying the correction factors at the full range monitor operation unit 52.

According to this embodiment, the SRNM can be calibrated at the low power output stage of 10% or 20% of the rated power at the start-up of the reactor in a reactor operating cycle. Furthermore, prior to reactor shutdown, by means of the same constitution, the sensitivity of the SRNM detector changed during the power operation can be calibrated and the latest sensitivity calibration result can be used at the time of regular inspection and reactor start-up in the next cycle.

As described hereinabove, in a neutron flux measuring apparatus according to the present invention, the numbers of neutron detectors, neutron detector assemblies, flanges for installing neutron detectors and neutron detector guide tubes arranged in the reactor pressure vessel can be reduced, and labor of operators or workers during the operation can be reduced and, thereby, a neutron flux measuring apparatus at lower cost and with improved operability can be realized without deteriorating monitoring performance.

It is to be noted that the present invention is not limited to the described embodiments and many other changes and modifications may be made without departing from the scopes of the appended claims.

What is claimed is:

1. A neutron flux measuring apparatus, adapted to a boiling-water reactor (BWR) of a nuclear power plant and an advanced boiling-water reactor (ABWR) of a nuclear power plant, for measuring a neutron flux in a reactor pressure vessel, said neutron flux measuring apparatus comprising:

a plurality of neutron flux detector assemblies each incorporating a start-up range monitor detector, each of said plurality of neutron flux detector assemblies comprising a local power range monitor detector, a start-up range neutron monitor detector, calibrating means for calibrating sensitivity of said local power range monitor detector and a cover tube incorporating the local power range monitor detector, the start-up range neutron monitor detector and the calibrating means;

a plurality of neutron flux detector assemblies each comprising said local power range monitor detector, said calibrating means and said cover tube;

a preamplifier amplifying a detector signal obtained from said start-up range neutron monitor detector;

a start-up range neutron monitor operation unit operating, indicating and monitoring the amplified signal obtained from said start-up range neutron monitor detector;

a local power range monitor operation unit operating, indicating and monitoring a signal obtained from said local power range monitor detector; and an average power range monitor operation unit averaging, indicating and monitoring signals obtained from a plurality of local power range monitor detectors;

where the start-up range neutron monitor detector, distinct from the local power range monitor detector, is configured to measure neutron flux in the reactor pressure vessel in a low power range operation of the reactor pressure vessel, and where the local power range monitor detector, distinct from the start-up range neutron monitor detector, is configured to measure neutron flux in the reactor pressure vessel in a high power range operation of the reactor pressure vessel.

2. A neutron flux measuring apparatus according to claim 1, wherein said start-up range monitor operation unit and the local power range monitor operation unit are integrated into a single unit.

3. A neutron flux measuring apparatus according to claim 2, further comprising reactor mode monitoring means for inputting and monitoring a state of a reactor mode switch and calculation frequency switching means for making high calculation frequency of a start-up range monitor operation function and making low a calculation frequency of a power range monitor operation function within an integrated operation unit of the neutron flux measuring apparatus while a reactor mode is in a start-up state, and for conversely low making a calculation frequency of the start-up range monitor operation function and making high a calculation frequency of the power range monitor operation function while the reactor mode is in an operation state.

4. A neutron flux measuring apparatus according to claim 1, wherein said average power range monitor operation unit, said start-up range neutron monitor operation unit and said local power range monitor operation unit are integrated into a single unit.

5. A neutron flux measuring apparatus according to claim 1, wherein said start-up range neutron monitor detector includes a bypass group having same detector channel arrangement as a detector channel arrangement of a reactor protection system division.

6. A neutron flux measuring apparatus according to claim 1, wherein each of said neutron flux detector assemblies includes a start-up range neutron monitor detector coated with an insulation layer having resistance to an environment within a reactor pressure vessel.

7. A neutron flux measuring apparatus according to claim 1, wherein said neutron flux detector assembly includes a start-up range neutron monitor detector installed in a small-diameter hollow tube.

8. A neutron flux measuring apparatus according to claim 1, wherein each of the reactor protection division is provided with a plural signal processing start-up range neutron monitor operation unit, which operates, indicates and monitors signals of a plurality of start-up range neutron monitor detectors belonging to the same reactor protection system division.

9. A neutron flux measuring apparatus according to claim 8, wherein said plural signal processing start-up range neutron monitor operation unit, at least one type of local power range monitor operation unit or average power range monitor operation unit are commonly integrated into a single unit per protection system division.

10. A neutron flux measuring apparatus according to claim 9, further comprising bypass means for bypassing a plural signal processing start-up range neutron monitor operation function belonging to one of the reactor protection system divisions.

11. A neutron flux measuring apparatus according to claim 10, further comprising bypass means for bypassing an average power range monitor operation function belonging to one of reactor protection system divisions.

12. A neutron flux measuring apparatus according to claim 8, further comprising bypass means for bypassing an integrated monitor operation unit t belonging to one of reactor protection system divisions and for simultaneously bypassing an average power range monitor operation function and a plural signal processing start-up range neutron monitor operation function.

13. A neutron flux measuring apparatus according to claim 9, further comprising automatic correction means for correcting a start-up range neutron monitor output obtained as a result of operating a start-up range neutron monitor signal using an average power range monitor output which is a result of averaging operation of said average power range monitor operation unit.

14. A neutron flux measuring apparatus according to claim 13, further comprising reactor mode monitoring means for inputting and monitoring a state of a reactor run mode switch and automatic correction means for correcting a start-up range neutron monitor output and for making said start-up range neutron monitor output coincident with an average power range monitor output when a reactor mode is switched from start-up to operation or operation to start-up.

15. A neutron flux measuring apparatus according to claim 13, further comprising alarm determining means for determining whether an average power range monitor output reaches a downscale value and automatic correction means for correcting the start-up range neutron monitor output using a signal of the alarm determining means and for making said start-up range neutron monitor output coincident with the average power range monitor output.

16. A neutron flux measuring apparatus according to claim 13, further comprising alarm determining means for determining whether an average power range monitor output reaches an upscale alarm value in a mode other than reactor operation mode and automatic correction means for correcting the start-up range neutron monitor output using a signal of the alarm determining means and for making said start-up range neutron monitor output coincident with the average power range monitor output.

17. A neutron flux measuring apparatus according to claim 9, further comprising automatic correction means for inputting a signal of a local power range monitor detector arranged closest to the start-up range neutron monitor detector into the average power range monitor operation unit into which a signal of said start-up range neutron monitor detector is inputted and for correcting the start-up range neutron monitor output using a local power range monitor output obtained from an operation result of operating said local power range monitor detector signal.

18. A neutron flux measuring apparatus according to claim 9, further comprising automatic correction-means for taking in a reactor operating parameter and calculating an output distribution in the reactor using a three-dimensional BWR simulation function incorporated into a reactor core performance monitoring unit connected to calibrating means, for obtaining -and transmitting a value read by a start-up range neutron monitor detector from the output distribution calculation result, for correcting a start-up range neutron monitor output and for making said start-up range neutron monitor output coincident with said read calculation value.

19. A neutron flux measuring apparatus according to claim 1, wherein a plurality of neutron flux detector assemblies, each incorporating a start-up range neutron monitor detector are arranged in the vicinity of a center of a reactor core, the number of the neutron flux detector assemblies being the same as the number of reactor protection system divisions, said neutron flux detector assemblies, the number of which is twice or more of the number of reactor protection system divisions, are arranged on a peripheral portion surrounding the neutron flux detector assemblies arranged in vicinity of a center of the reactor core, and further comprising start-up range neutron monitor detector bypass groups, the number of which is the same as the number of the reactor protection system divisions, including a set of a start-up range neutron monitor detector incorporated into one neutron flux detector assembly in vicinity of a center and the start-up range neutron monitor detector incorporated into two or more neutron flux detector assemblies on the peripheral portion, said start-up range neutron monitor detectors being allotted to the reactor protection system divisions with the same groups as the bypass groups.

20. A neutron flux measuring apparatus according to claim 19, further comprising bypass means for bypassing an operating, indicating and monitoring function for an optional one of signals from start-up range neutron monitor detectors belonging to the same reactor protection system division.

* * * * *